(12) United States Patent
Ma

(10) Patent No.: US 11,981,364 B2
(45) Date of Patent: May 14, 2024

(54) CART

(71) Applicant: CH BABY CO., LTD, Shaoxing (CN)

(72) Inventor: Congquan Ma, Shaoxing (CN)

(73) Assignee: CH BABY CO., LTD, Shaoxing (CN)

( * ) Notice: Subject to any disclaimer, the term of this patent is extended or adjusted under 35 U.S.C. 154(b) by 284 days.

(21) Appl. No.: 17/549,787

(22) Filed: Dec. 13, 2021

(65) Prior Publication Data

US 2022/0097748 A1 Mar. 31, 2022

Related U.S. Application Data

(63) Continuation of application No. PCT/CN2020/091834, filed on May 22, 2020.

(30) Foreign Application Priority Data

Jun. 14, 2019 (CN) .......................... 201910516127.1
Jun. 14, 2019 (CN) .......................... 201920896383.3
(Continued)

(51) Int. Cl.
*B62B 3/02* (2006.01)
*B62B 5/00* (2006.01)
(Continued)

(52) U.S. Cl.
CPC .............. *B62B 3/02* (2013.01); *B62B 5/0006* (2013.01); *B62B 5/0013* (2013.01); *B62B 5/04* (2013.01);
(Continued)

(58) Field of Classification Search
CPC ........... B62B 3/007; B62B 3/02; B62B 3/025; B62B 2205/06; B62B 5/04; B62B 5/061;
(Continued)

(56) References Cited

U.S. PATENT DOCUMENTS 5,915,723 A * 6/1999 Austin ...................... B62B 3/02
280/47.35
6,308,805 B1 * 10/2001 Lan ......................... B62B 9/087
280/647
(Continued)

FOREIGN PATENT DOCUMENTS

| CN | 105781225 A | 7/2016 |
|----|-------------|--------|
| CN | 206307075 U | 7/2017 |

(Continued)

OTHER PUBLICATIONS

International Search Report issued in corresponding International application No. PCT/CN2020/091834 dated Aug. 6, 2020.
(Continued)

*Primary Examiner* — Emma K Frick

(57) ABSTRACT

A cart has a folded configuration and a deployed configuration. The cart includes two side frames arranged opposite to each other; and a plurality of support members connected between the two side frames. Each side frame includes a vertical synchronization rod with a front foot assembly and a rear foot assembly arranged on two sides of the vertical synchronization rod. The front foot assembly includes a front foot rod with an upper front oscillating rod and a lower front oscillating rod hinged between the vertical synchronization rod and the front foot rod. A bottom of the front foot rod is hinged to a front wheel. The rear foot assembly includes a rear foot rod with an upper rear oscillating rod and a lower rear oscillating rod hinged between the vertical synchronization rod and the rear foot rod. A bottom of the rear foot rod is hinged to a rear wheel.

21 Claims, 9 Drawing Sheets

(30) Foreign Application Priority Data

| Jun. 14, 2019 | (CN) | .......................... 201920897247.6 |
| Jun. 14, 2019 | (CN) | .......................... 201920901075.5 |
| Jun. 14, 2019 | (CN) | .......................... 201920901673.2 |

(51) Int. Cl.
    *B62B 5/04*         (2006.01)
    *B62B 5/06*         (2006.01)
    *B62B 5/08*         (2006.01)

(52) U.S. Cl.
    CPC .......... *B62B 5/0433* (2013.01); *B62B 5/0461* (2013.01); *B62B 5/061* (2013.01); *B62B 5/067* (2013.01); *B62B 3/025* (2013.01); *B62B 2005/0471* (2013.01); *B62B 5/082* (2013.01)

(58) Field of Classification Search
    CPC ....... B62B 5/0461; B62B 9/082; B62B 9/087; B60B 33/0086; B60B 33/045
    See application file for complete search history.

(56) References Cited

U.S. PATENT DOCUMENTS

| 7,770,911 | B2 * | 8/2010 | Dotsey ...................... B62B 7/08 |
| | | | 280/658 |
| 8,376,374 | B2 * | 2/2013 | Zhong ................. B60B 33/0057 |
| | | | 280/47.38 |
| 8,388,015 | B2 * | 3/2013 | Chen ......................... B62B 3/02 |
| | | | 280/642 |
| 8,540,059 | B2 * | 9/2013 | Li ............................ B62B 9/087 |
| | | | 188/73.1 |
| 8,973,940 | B2 * | 3/2015 | Chen ......................... B62B 3/02 |
| | | | 280/638 |
| 8,991,007 | B2 * | 3/2015 | Tsai .................... B60B 33/0084 |
| | | | 16/35 R |
| 9,302,544 | B2 * | 4/2016 | Jie ....................... B60B 33/0078 |
| 9,845,102 | B2 * | 12/2017 | Bastien .................... B62B 7/008 |
| 9,896,118 | B2 * | 2/2018 | Choi ...................... B62B 3/007 |
| 10,099,711 | B1 * | 10/2018 | Sun ....................... B62B 3/007 |
| 10,099,712 | B1 * | 10/2018 | Sun ....................... B62B 5/067 |
| 10,106,186 | B2 * | 10/2018 | Choi ...................... C08K 5/00 |
| 10,292,491 | B1 * | 5/2019 | Ke .......................... A47F 5/137 |
| 10,414,422 | B2 * | 9/2019 | Choi ...................... B62B 9/082 |
| 10,464,588 | B1 * | 11/2019 | Lin ........................ B62B 7/08 |
| 10,501,103 | B1 * | 12/2019 | Wang ..................... B62B 3/007 |
| 10,604,170 | B1 * | 3/2020 | Davis ..................... B62B 3/008 |
| 10,633,010 | B1 * | 4/2020 | Zhang .................... B62B 3/025 |
| 11,091,183 | B2 * | 8/2021 | Wu ........................ B62B 3/007 |
| 11,208,132 | B2 * | 12/2021 | Chen ..................... B62B 3/025 |
| 11,247,708 | B2 * | 2/2022 | Wang .................... B62B 3/025 |
| 11,465,664 | B1 * | 10/2022 | Choi ..................... B62B 3/025 |
| 11,772,698 | B2 * | 10/2023 | Cui ....................... B62B 7/008 |
| | | | 280/650 |
| 2003/0025301 | A1 * | 2/2003 | Banuelos, III ......... B62B 3/022 |
| | | | 280/47.38 |
| 2023/0219608 | A1 * | 7/2023 | Jiang .................... B62B 3/025 |
| | | | 280/651 |

FOREIGN PATENT DOCUMENTS

| CN | 107848553 A | | 3/2018 |
| CN | 207202585 U | | 4/2018 |
| CN | 109153398 A | | 1/2019 |
| DE | 202017100939 U1 | * | 6/2017 |
| JP | 3146007 U | * | 10/2008 |

OTHER PUBLICATIONS

Written Opinion of the International Search Authority in corresponding International application No. PCT/CN2020/091834.

* cited by examiner

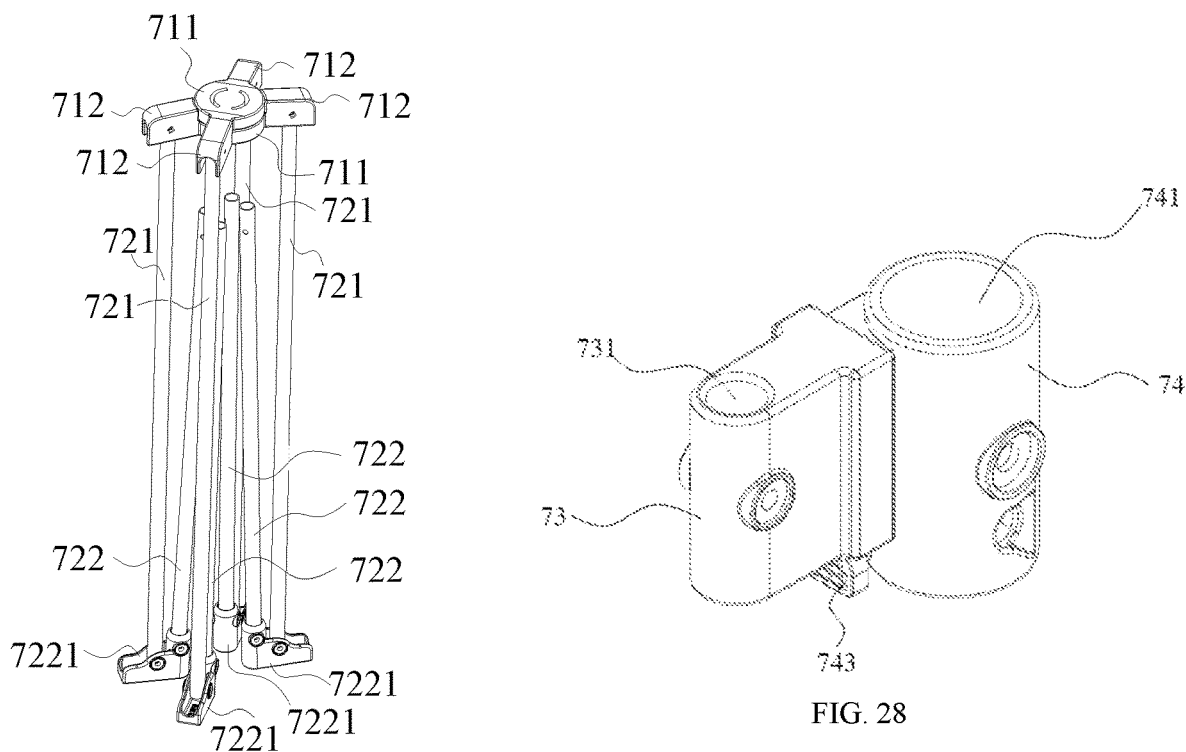
FIG. 27
FIG. 28
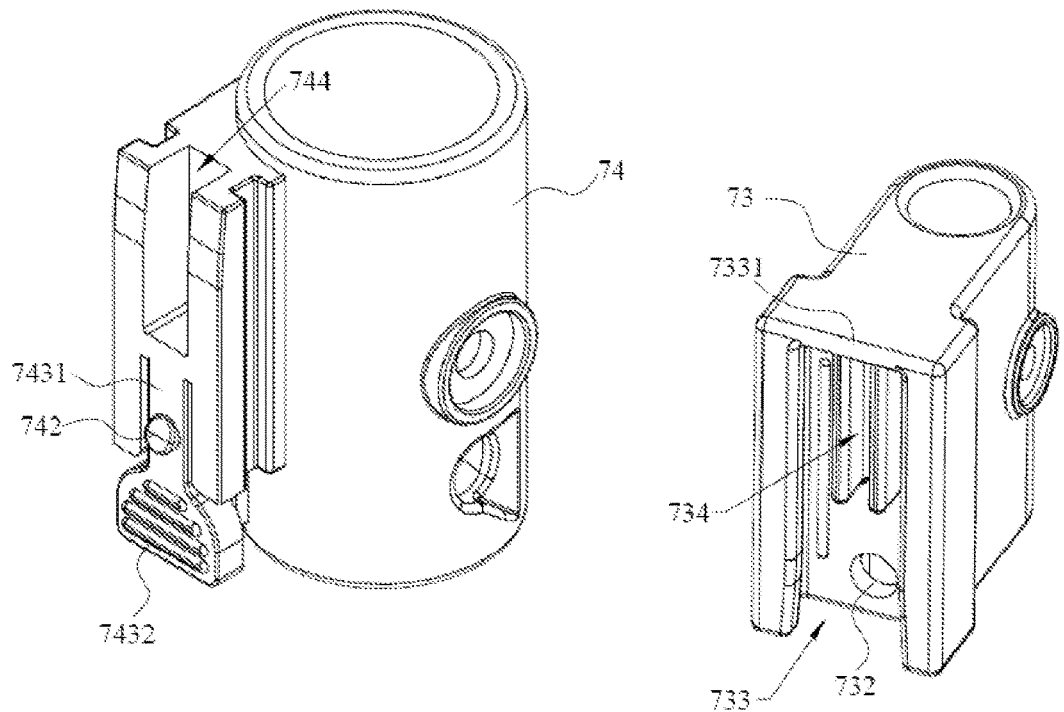
FIG. 29

CART

TECHNICAL FIELD

The present disclosure relates to transportation tools, in particular to a cart capable of loading goods and children.

BACKGROUND

A cart usually includes a front foot assembly and a rear foot assembly. The front foot assembly and the rear foot assembly of some carts are slantwise arranged, with their tops rotatably connected and bottoms provided with wheels. A seat assembly is arranged above a connection between the front foot assembly and the rear foot assembly. However, this type of cart is generally only suitable for single individual ride.

In order to increase the number of passengers and other uses, front and rear foot rods of some carts are opposite and vertically arranged, and a frame structure for loading goods or children is formed between them. The frame structure includes two side baffles. In order to facilitate carrying and packaging, the side baffles are generally foldable. For example, CN204341120U discloses a side baffle structure, which includes two hinged cross frames. One of the rods of the cross frames is hinged to the front foot rod or the rear foot rod, and the other rod is in sliding fit with the front foot rod or the rear foot rod. However, this structure is not convenient for setting a bottom support and will increase the complexity of the cart.

SUMMARY

The present disclosure provides a multi-functional cart, which solves the problem that an existing cart is not convenient for setting a bottom support.

A cart has a folded configuration and a deployed configuration. The cart includes two side frames arranged opposite to each other; and a plurality of support members connected between the two side frames. Each side frame includes a vertical synchronization rod with a front foot assembly and a rear foot assembly arranged on two sides of the vertical synchronization rod. The front foot assembly includes a front foot rod with an upper front oscillating rod and a lower front oscillating rod hinged between the vertical synchronization rod and the front foot rod. A bottom of the front foot rod is hinged to a front wheel. The rear foot assembly includes a rear foot rod with an upper rear oscillating rod and a lower rear oscillating rod hinged between the vertical synchronization rod and the rear foot rod. A bottom of the rear foot rod is hinged to a rear wheel, In the folded state, the front foot assembly and the rear foot assembly respectively move towards the vertical synchronization rod; and in the deployed state, the front foot assembly and the rear foot assembly are correspondingly unfolded In the present disclosure, the support members are directly arranged between the two groups of lower oscillating rods, and the supporting members can be packed up as the side frames fold, so there is no need to dispose foldable support members separately, which simplifies the structure of a cart frame.

BRIEF DESCRIPTION OF THE DRAWINGS

FIG. 27 is a schematic view of the roof bracket in FIG. 1 in a folded state;

FIG. 28 is a schematic view of a plug and a socket in one embodiment;

FIG. 29 is a schematic structural view of the plug and the socket in FIG. 28.

DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

It should be noted that when an assembly is referred to as being "connected" to another assembly, it can be directly connected to another assembly or an intermediate assembly may also exist. When one component is considered to be "provided" on another component, it can be directly provided on the other component or an intermediate component may be present at the same time.

Unless otherwise defined, all technical and scientific terms used herein are the same as meanings of general understandings of those skilled in the art of the disclosure. The terms used in the description of the present disclosure herein are merely to describe the specific embodiments, not intended to limit the present disclosure. The term "and/or" used herein includes any and all combinations of one or more related listed items.

Figure 1:
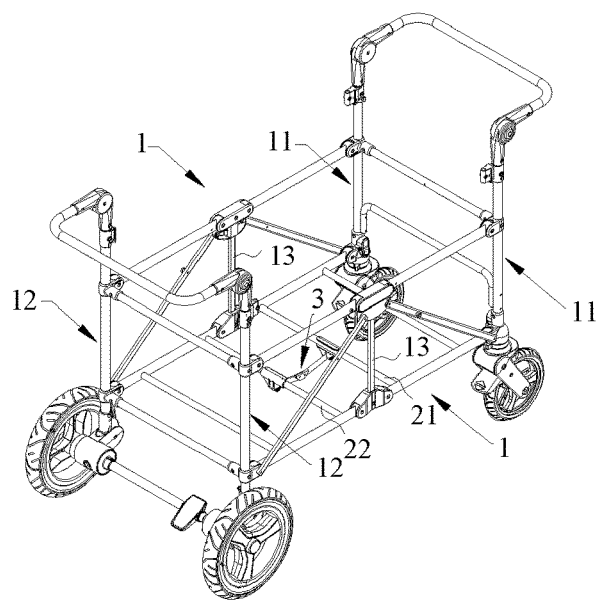
FIG. 1 is a schematic view of a cart according to one embodiment.
Figure 2:
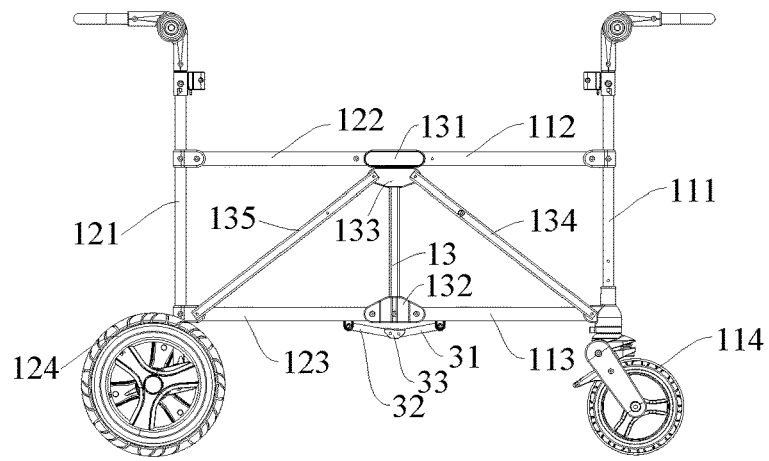
FIG. 2 is a schematic view of a side surface of the cart in FIG. 1.

Referring to FIGS. 1 to 2, the present disclosure discloses a cart having a deployed state and a folded state and including two side frames 1 arranged side by side and a plurality of support members connected between the two side frames 1. The side frames and the support members cooperatively form an substantially cuboid-shaped frame structure, so as to accommodate carried goods or children. Each side frame 1 includes a vertical synchronization rod 13 and a front foot assembly 11 and a rear foot assembly 12 which are distributed on two sides of the vertical synchronization rod 13. In the folded state, the front foot assembly 11 and the rear foot assembly 12 respectively move towards the vertical synchronization rod 13. In the deployed state, the front foot assembly 11 and the rear foot assembly 12 are correspondingly deployed.

In one embodiment, the support members include a first connection member 21 connected between the front foot assemblies 11 of the two side frames 1, and a second connection member 22 connected between the rear foot assemblies 12 of the two side frames 1. A locking mechanism 3 for restraining a relative position between the first connection member 21 and the second connection member 22 to keep the deployed state is provided between the first connection member 21 and the second connection member 22. The locking mechanism 3 further has an unlocked state for allowing the first connection member 21 and the second connection member 22 to move towards each other.

In this art, the rod pieces are tubes in order to reduce the weight or for receiving lines. However, whether it is a tube or a rod piece, the core purpose is to transmit a torque and support a cart frame. Therefore, the rod piece herein may also be in various implementation forms, such as a hollow tube or other component that can support multi-directional torques with stretching resistance, anti-pressure and anti-bending properties, such cases are also applicable for the support members. It is worth noting that the support members are not necessarily longitudinal rods or tubes. The first connection member 21 is taken as an example. The first connection member 21 is configured to move with the front foot assemblies 11 and synchronizes the movements of the front foot assemblies 11 of the two side frames 1. The first connection member 21 may be designed as a plate, or even a complex object, such as a chair. Therefore, in practice, there are various design forms for the first connection member 21, it may be a part of a certain component or may be a movable component inside a certain component. The other components are formed in the same way.

At the same time, the terms of hinged connection, rotatable connection, etc. mentioned in the present disclosure may be realized by common technical means in the art without particular description. For example, the components are sequentially stacked in an axial direction at a pin and is in rotatable fit by the pin. The pin may be a separate component, or may be integrally formed with one of the components.

The front foot rod 111 and a rear foot rod 121 as described in the present disclosure are referred to with respect to the direction when the cart is pushed forwards, which is not limited. For example, when a user stands behind the cart and pulls a push handle 14 to drive the cart to move back, at that time, the front foot rod 111 is located on the rear side of the rear foot rod 121 in a moving direction.

Specifically, in the present embodiment, in the deployed state of the cart, the plurality of support members between the two side frames 1 keep the stability between the two side frames 1, and the deployed state of the single side frame 1 is maintained through the locking mechanism 3. Since the locking mechanism 3 is arranged on the first connection member 21 and the second connection member 22, the states of the two side frames 1 can be kept synchronous, thus realizing deploying or folding of the entire cart. In order to achieve the folding and deploying of the cart, the front foot assembly 11 and the rear foot assembly 12 may be connected to the vertical synchronization rod 13 respectively through a deformable rod piece structure. When the locking mechanism 3 works, the relative position relationship between the first connection member 21 and the second connection member 22 is determined, and the deformable rod piece structures of the front foot assembly 11 and the rear foot assembly 12 cannot deform, thus achieving a stable spatial structure of the cart.

The deformable rod piece structures of the front foot assembly 11 and the rear foot assembly 12 define different spatial structures of the cart in the folded state and the deployed state. Referring to FIGS. 1-2, in one embodiment, the front foot assembly 11 includes a front foot rod 111, and an upper front oscillating rod 112 and a lower front oscillating rod 113 which are hinged between the vertical synchronization rod 13 and the front foot rod 111. The bottom of the front foot rod 111 is hinged with a front wheel 114. The rear foot assembly 12 includes a rear foot rod 121, and an upper rear oscillating rod 122 and a lower rear oscillating rod 123 which are hinged between the vertical synchronization rod 13 and the rear foot rod 121. The bottom of the rear foot rod 121 is hinged with a rear wheel 124.

The front foot assembly 11 forms a deformable four-connection-rod mechanism together with the vertical synchronization rod 13 through the front foot rod 111, the upper front oscillating rod 112, and the lower front oscillating rod 113. In the deploying process of the cart, the four-connection-rod mechanism can deform to realize that the front foot assembly 11 moves away from the vertical synchronization rod 13. In the folding process of the cart, the four-connection-rod mechanism can deform to realize that the front foot assembly 11 moves towards the vertical synchronization rod 13. Therefore, the four-connection-rod mechanism constitutes a basic unit for changing the spatial state of the cart.

The rear foot assembly 12 has the same constructure as the front foot assembly 11, and descriptions thereof are not repeated.

In the present disclosure, the front foot assembly 11 and the rear foot assembly 12 both cooperate with the vertical synchronization rod 13. Therefore, the vertical synchronization rod 13 needs to be connected with a large number of rod pieces. In one embodiment, an upper joint 131 is mounted at the top of the vertical synchronization rod 13, and a lower joint 132 is mounted at the bottom. In the same side frame 1:

one end of the upper front oscillating rod 112 is hinged to the upper joint 131, and the other end of the upper front oscillating rod 112 is hinged to the front foot rod 111;

one end of the lower front oscillating rod 113 is hinged to the lower joint 132, and the other end of the lower front oscillating rod 113 is hinged to the front foot rod 111;

one end of the upper rear oscillating rod 122 is hinged to the upper joint 131, and the other end of the upper rear oscillating rod 122 is hinged to the rear foot rod 121;

one end of the lower rear oscillating rod 123 is hinged to the lower joint 132, and the other end of the lower rear oscillating rod 123 is hinged to the rear foot rod 121.

However, the increase of the number of the rod pieces will increase the volume of the joint and make a load heavier, which is unfavorable for realizing a tidy folded state of the cart. Therefore, for specific design, the upper joint 131 is provided with two independent hinge positions respectively located on two sides of the vertical synchronization rod 13. The upper front oscillating rod 112 and the upper rear oscillating rod 122 are respectively connected to the upper joint 131. The lower joint 132 is designed the same way as the upper joint. Compared to a single hinge point, two hinge points provide the advantage that the oscillating rods at the same height can be set on the same horizontal level in the deployed state more easily.

As mentioned above, the cart frame of the present disclosure includes a plurality of four-connection-rod mechanisms. In order to ensure a stable deployed state of the cart, the spatial position relationships of the rod pieces need to be constrained by, for example, a plurality of locking devices, which is very complicated. However, the plurality of locking devices will greatly increase the design and production cost and cause impact on users' use. Therefore, referring to FIGS. 1-2 and FIGS. 4-5, in one embodiment, the locking mechanism 3 includes:

a first lock rod 31 hinged to the first connection member 21;

a second lock rod 32 hinged to the second connection member 22; and a limiting seat 33, the first lock rod 31 and the second lock rod 32 extending towards each other and being hinged to the limiting seat 33.

When an included angle between the first lock rod 31 and the second lock rod 32 is 180°, the locking mechanism 3 is in a state where a dead position is presented. After moving downwardly and crossing the dead position, the limiting seat 33 is in a locked state and restrains the relative movement between the first lock rod 31 and the second lock rod 32. After moving upwardly to cross the dead position, the limiting seat 33 is in an unlocked state.

The locking mechanism 3 in the present disclosure determines a position relationship between one rod piece of the front foot assembly 11 and one rod piece of the rear foot assembly 12, so that a spatial position relationship between the front foot assembly 11 and the rear foot assembly 12 can be realized by one locking mechanism 3, and demands for a stable deployed state and a flexible folding process are perfectly balanced.

When the cart is in the deployed state, the locking mechanism 3 is in the locked state. This state may be realized by various means, such as an elastic member released by the movement of the rod piece. For another example, the limiting seat 33 moves downwards and crosses the dead position under its gravity. In this state, the trend that the first connection member 21 and the second connection member 22 move towards each other will be restrained by the limiting seat 33, so that the cart is kept in the deployed state.

When the cart needs to transition into the folded state, the limiting seat 33 is lifted to cross the dead position, relative movements of the first connection member 21 and the second connection member 22 can be achieved after the locking mechanism 3 transitions into the unlocked state.

Therefore, the specific structure of the limiting seat 33 determines a working process and a locking effect of the locking mechanism 3. In one embodiment, a mounting slot is formed in the limiting seat 33. The first lock rod 31 and the second lock rod 32 are hinged in the mounting slot. In a used state, the lower part of the mounting slot is opened to allow the first lock rod 31 and the second lock rod 32 to forwards rotate towards each other. The top of the mounting slot is closed to restrain reverse rotation of the first lock rod 31 and the second lock rod 32.

The mounting slot limits the rotation of the first lock rod 31 and the second lock rod 32. When the limiting seat 33 does not cross the dead position, and the first lock rod 31 and the second lock rod 32 are pressed towards each other, the first lock rod and the second lock rod forwards rotate towards each other, and at this time, the locking mechanism 3 is in the unlocked state. When the limiting seat 33 is at the dead position, and the first lock rod 31 and the second lock rod 32 are pressed towards each other, directions of forces exerting on the first lock rod 31 and the second lock rod 32 are along their lengthwise directions respectively. Therefore, the locking mechanism 3 is locked, but this state is unstable and may be destroyed under vibration and other factors. When the limiting seat 33 crosses the dead position, and the first lock rod 31 and the second lock rod 32 are pressed towards each other, the first lock rod and the second lock rod can only generate reverse rotation to move towards each other relatively, but this trend will be restrained by the limiting seat 33. Therefore, the locking mechanism 3 is in the locked state.

Actually, the locking mechanism 3 is not necessary. For example, a unidirectional rotation limiting mechanism may be arranged on the upper joint 131 and the lower joint 132. The structure of the unidirectional rotation limiting mechanism is similar to that of the mounting slot. When the oscillating rods at the same height are located on the same horizontal level, the unidirectional rotation limiting mechanism restrains the oscillating rods from oscillating upwards relative to the joints and keeps the oscillating rods in a horizontal state. Generally, goods will be carried inside the frame structure. The weight of the goods will exert on the lower oscillating rods and avoid the oscillating rods from turning up. The locking mechanism is arranged on the basis of this structure, it can be considered as double locks.

Figure 6:
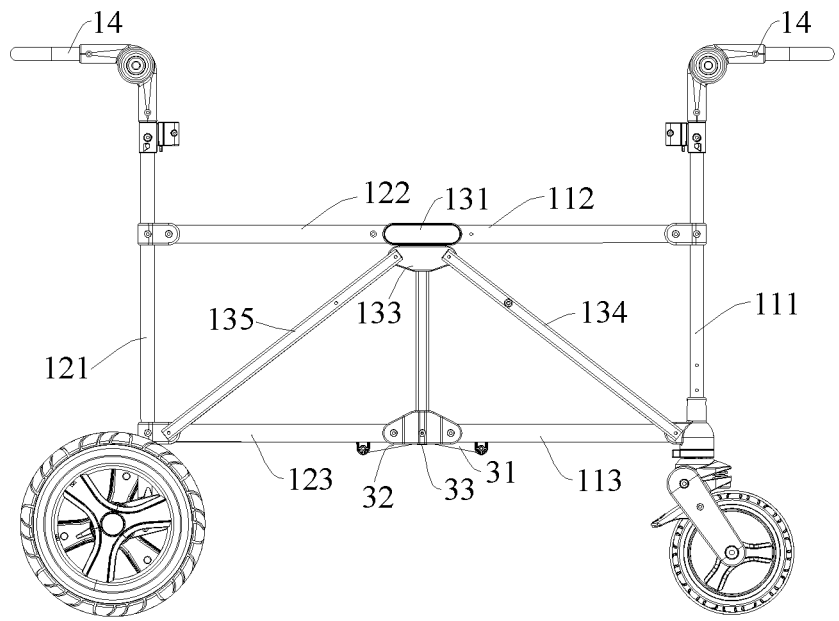
FIG. 6 is a schematic view illustrating the cart in FIG. 1 in a first stage of a folding process.
Figure 7:
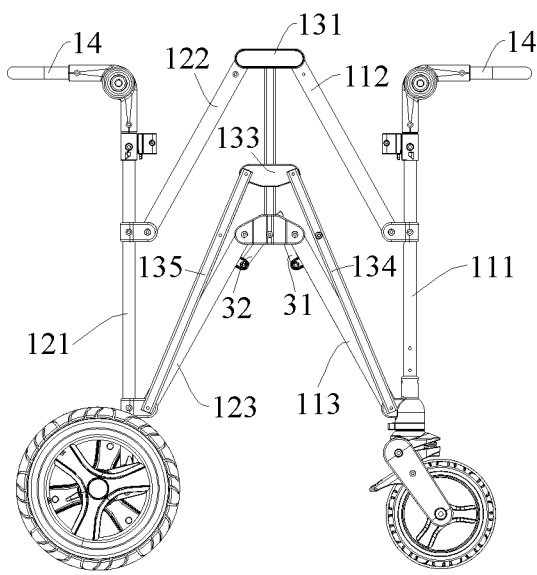
FIG. 7 is a schematic view illustrating the cart in FIG. 1 in a second stage of the folding process.
Figure 8:
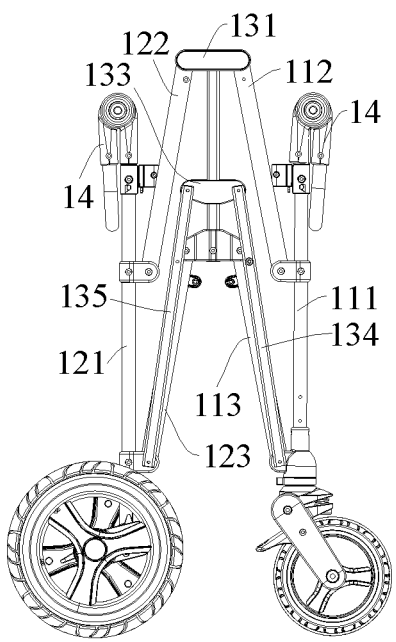
FIG. 8 is a schematic view showing the cart in FIG. 1 in a folded state.

By either the locking mechanism or the unidirectional rotation limiting mechanism arranged on the joints, when the cart carries an object, the strength of the limiting mechanism may be insufficient, and the cart frame may be broken. In order to enhance the strength, as shown in FIG. 2 and FIG. 6, in one embodiment, the front foot rod 111, the upper front oscillating rod 112, the lower front oscillating rod 113, and the vertical synchronization rod 13 form a deformable first parallelogram; and the rear foot rod 121, the upper rear oscillating rod 122, the lower rear oscillating rod 123, and the vertical synchronization rod 13 form a deformable second parallelogram; the vertical synchronization rod 13 is provided with a synchronization sliding block 133; the synchronization sliding block 133 is hinged with a first diagonal draw bar 134 and a second diagonal draw bar 135 which respectively restrain the deformation degrees of the parallelograms; and ends of the two diagonal draw bars away from the synchronization sliding block 133 are respectively hinged to parts of the corresponding parallelograms away from the vertical synchronization rod 13.

The first diagonal draw bar 134 and the second diagonal draw bar 135 limit the deformation degrees of the parallelograms, thus restraining the deploy extent of the cart. One end of the first diagonal draw bar 134 moves with one of the front foot rods 111, the upper front oscillating rod 112, the lower front oscillating rod 113, and the vertical synchronization rod 13, and the other end moves with the synchronization sliding block 133. In one embodiment, the front foot rod 111 is provided with a first hinge seat 41 located at the upper part and a second hinge seat 42 located at the lower part; the two front oscillating rods are respectively hinged to the corresponding hinge seats; and the first diagonal draw bar 134 is hinged to the second hinge seat 42.

In this design, the first diagonal draw bar 134, the lower front oscillating rod 113, and the vertical synchronization rod 13 actually form one sliding block mechanism. The sliding block mechanism shares two rod pieces with the parallelogram, so that the travel of the sliding block mechanism can restrain the deformation degree of the parallelogram.

One end of the second diagonal draw bar 135 moves with one of the rear foot rod 121, the upper rear oscillating rod 122, the lower rear oscillating rod 123, and the vertical synchronization rod 13, and the other end moves with the synchronization sliding block 133. In one embodiment, the rear foot rod 121 is provided with a third hinge seat 43 located at the upper part and a fourth hinge seat 44 located at the lower part; the two rear oscillating rods are hinged to the corresponding hinge seats; and the second diagonal draw bar 135 is hinged to the fourth hinge seat 44.

The second diagonal draw bar 135 is configured in the same way as the first diagonal draw bar 134, and descriptions thereof are not repeated.

In the present embodiment, the sliding block mechanisms of the first diagonal draw bar 134 and the second diagonal draw bar 135 share the same synchronization sliding block 133, so that the travel of the synchronization sliding block 133 determines the deformation degrees of the parallelograms. The synchronization sliding block 133 is mounted on the vertical synchronization rod 13. As shown in the drawings, the top end of the vertical synchronization rod 13 is provided with the upper joint 131, and the bottom is provided with the lower joint 132. In one embodiment, in the deployed state, the front foot rod 111 and the rear foot rod 121 are located away from the vertical synchronization rod 13, and the top surface of the synchronization sliding block 133 abuts against the bottom surface of the upper joint 131, to prevent the upper joint 131 from moving further downwards, and it is supported by the diagonal draw bars, thus restraining the upper oscillating rods from oscillating further upwardly and enhancing the strength of the frame structure. Of course, it is also possible to provide a locking mechanism between the vertical synchronization rod 13 and the synchronization sliding block 133, which can also achieve a similar function, but this is more complicated than the structure in which the upper joint 131 abuts against the synchronization sliding block 133.

During folding, the vertical synchronization rod 13 moves upwardly (referring to the orientation shown in the drawing) relative to the front foot rod 111 and the rear foot rod 121, and in the folded state, the front foot rod 111 and the rear foot rod 121 respectively have moved towards the vertical synchronization rod 13.

During transitioning between the folded state and the deployed state of the cart, the synchronization sliding block 133 moves on the vertical synchronization rod 13. In the present embodiment, when the cart is in the deployed state, the top surface of the synchronization sliding block 133 abuts against the bottom surface of the upper joint 131, thus providing a terminal of movement for the deploying process of the cart. Therefore, when the top surface of the synchronization sliding block 133 abuts against the bottom surface of the upper joint 131, even if there is no other locking mechanisms 3, the cart can also be kept stable in the deployed state. When the cart transitions into the folded state from the deployed state, the sliding block mechanism having the synchronization sliding block 133 can release and allow the deformation trend of the parallelograms of the cart, without affecting the folding of the cart.

The above describes the deploying and folding of the cart in case of having a single side frame 1. However, in this art, a product with a single side frame 1 is unable to stand. Therefore, referring to FIGS. 1-3, in one embodiment, the front foot rod 111 is provided with a first hinge seat 41 located at the upper part and a second hinge seat 42 located at the lower part, and a first reinforcement rod 411 is connected between the first hinge seats 41 of the two side frames 1, and a second reinforcement rod (not shown) is connected between the second hinge seats 42 of the two side frames 1. The rear foot rod 121 is provided with a third hinge seat 43 located at the upper part and a fourth hinge seat 44 located at the lower part, and a third reinforcement rod 431 is connected between the third hinge seats 43 of the two side frames 1, and a fourth reinforcement rod 441 is connected between the fourth hinge seats 44 of the two side frames 1. In the deployed state of the foldable cart (as shown in FIG. 1), the first reinforcement rod 411, the third reinforcement rod 431, the upper front oscillating rod 112, and the upper rear oscillating rod 122 are located on the same plane. The second reinforcement rod, the fourth reinforcement rod 441, the lower front oscillating rod 113, and the lower rear oscillating rod 123 are located on the same plane.

As for the structure, the first reinforcement rod 411, the second reinforcement rod, the third reinforcement rod 431, and the fourth reinforcement rod 441 are all support members. The support members are mainly configured to keep the relative position relationship of the two side frames 1, and there is no strict limitation to the specific shape. The rod shape shown in the corresponding accompanying drawing of the present embodiment is only one of the implementation modes. For other functions, the support members may be modified in various ways.

Figure 3:
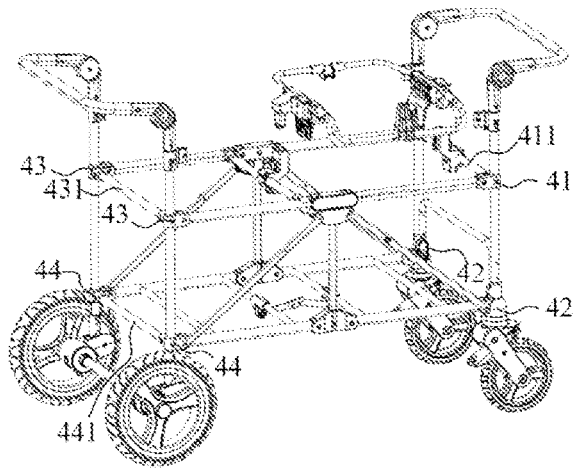
FIG. 3 is a schematic structural view of a cart according to another embodiment.
Figure 4:
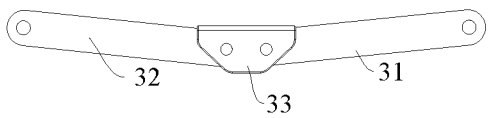
FIG. 4 is a schematic view of a locking mechanism (in a locked state) in FIG. 1.
Figure 5:
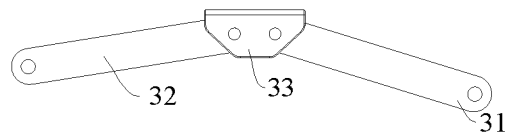
FIG. 5 is a schematic view of a locking mechanism (in an unlocked state) in FIG. 1.

In practice, the first reinforcement rod 411, the third reinforcement rod 431, the upper front oscillating rod 112, and the upper rear oscillating rod 122 cooperatively form a first carrying plane. Some extended devices (as shown in FIG. 3) can be mounted; the second reinforcement rod, the fourth reinforcement rod 441, the lower front oscillating rod 113, and the lower rear oscillating rod 123 cooperatively form a second carrying plane, which cooperates with the first diagonal draw bar 134, the second diagonal draw bar 135, and the vertical synchronization rod 13 which are located on the side surfaces of the first carrying plane and the second carrying plane to form a relatively closed internal space in the cart. Therefore, this design has the advantages that the various rod pieces on the cart frame of the cart not only form a cart frame structure that can be folded and deployed but also form a utility space that can realize various uses of the cart. For example, when the cart is used as a baby stroller, a comfortable space for children to lie down can be formed inside the cart frame. For another example, when the cart is used as a tool vehicle, a storage space for placing objects can be formed inside the cart frame. In an actual product, enclosure cloth may be arranged between the the rod pieces on the cart frame of the cart, thus better isolating the internal space.

Referring to FIGS. 1-2 and FIGS. 6-8, the folding and deploying processes of the cart will be described below in combination with the specific rod pieces:

When the cart transitions into the folded state from the deployed state, firstly, the locking mechanism 3 needs to be released. A user can directly apply an acting force to the limiting seat 33 or apply an acting force to the limiting seat 33 through a cable, a linkage rod piece, and other technical solutions, so as to drive the limiting seat 33 to move upwards to cross the dead position. At this time, the first lock rod 31 and the second lock rod 32 can move towards each other. Therefore, the user can drive the front foot assembly 11 and the rear foot assembly 12 to move towards each other by only applying, through the push handle 14, opposite acting forces to the front foot assembly 11 and the rear foot assembly 12. In the process that the front foot assembly 11 moves towards the vertical synchronization rod 13, the parallelogram formed by the front foot rod 111, the upper front oscillating rod 112, the lower front oscillating rod 113, and the vertical synchronization rod 13 deforms, and the vertical synchronization rod 13 moves towards as shown in the drawing, so as to reduce the distance between the front foot rod 111 and the vertical synchronization rod 13. In the deformation process of the parallelogram, the deformation is realized through the sliding mechanism where the synchronization sliding block 133 is located. In the process that the front foot assembly 11 moves towards the vertical synchronization rod 13, the synchronization sliding block 133 moves towards the lower joint 132. The components of the rear foot assembly 12 are working in the same way. When the front foot assembly 11 and the rear foot assembly 12 respectively lean against two sides of the vertical synchronization rod 13, the main body of the cart achieves the folded state. Since the push handle 14 is hinged to the front foot rod 111 or the rear foot rod 121, the user only needs to fold the push handle 14 to lean against a front push rod or a rear push rod. The push handle 14 is also provided with a locking mechanism, which may be realized through the common technical means in this art, and descriptions thereof are omitted here.

When the cart transition into the deployed state from the folded state, the parallelograms of the front foot assembly 11 and the rear foot assembly 12 and the movement processes of the sliding block mechanisms move in a reverse way, and descriptions thereof are omitted. It is worth noting that after the cart is completely deployed, the synchronization sliding block 133 will abut against the bottom surface of the upper joint 131, so that the upper joint 131 cannot move downwardly further. Since the deploying process of the cart is actually the down-movement process of the vertical synchronization rod 13, the upper joint 131 is unable to continue to move downwardly, and the vertical synchronization rod 13 is unable to move downwardly either, thus providing a terminal of the movement of the deploying process of the cart. In this state, the upper joint 131 will apply a downward force to the synchronization sliding block 133 along the vertical synchronization rod 13, and the synchronization sliding block 133 is supported through the first diagonal draw bar 134 and the second diagonal draw bar 135. Upon the force, the first diagonal draw bar 134 and the second diagonal draw bar 135 will apply a pull force for pulling the lower front oscillating rod 113 and the lower rear oscillating rod 123 towards two sides. The pull force is born by the lower joint 132 that is hinged to the lower front oscillating rod 113 and the lower rear oscillating rod 123, so that the down-movement trend of the vertical synchronization rod 13 is restrained by the structure formed by the first diagonal draw bar 134, the second diagonal draw bar 135, the lower front oscillating rod 113, and the lower rear oscillating rod 123. In this state, it can be ensured that the cart stands upright. However, if the front foot assembly 11 or the rear foot assembly 12 is subjected to a force towards the vertical synchronization rod 13, the cart will be transitioned into the folded state. Therefore, after the cart is completed deployed, the limiting seat 33 will move downwards to cross the dead position under the action of the gravity to prevent the first connection member 21 and the second connection member 22 from moving towards each other, and the cart is locked in the deployed state.

Figure 9:
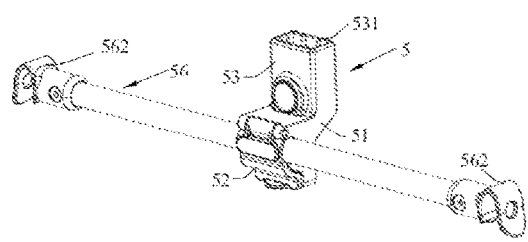
FIG. 9 is a schematic view of an extended system according to one embodiment.
Figure 10:
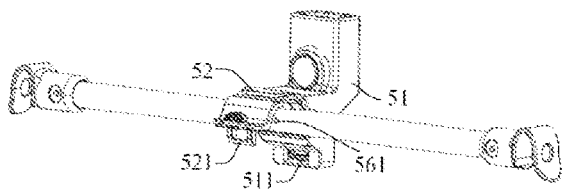
FIG. 10 is a schematic view of a disassembling process of the extended system in FIG. 9.
Figure 11:
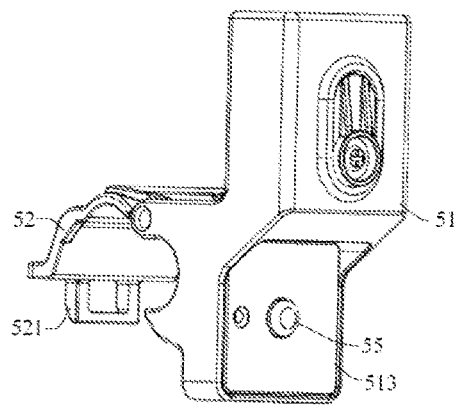
FIG. 11 is a schematic structural view of a back surface of the expanding seat in FIG. 9.
Figure 12:
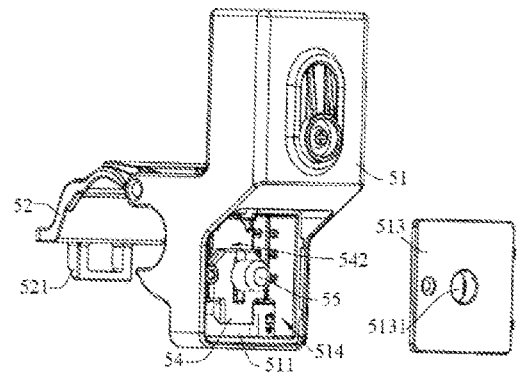
FIG. 12 is a schematic structural view of a working cavity of the expanding seat in FIG. 9.
Figure 13:
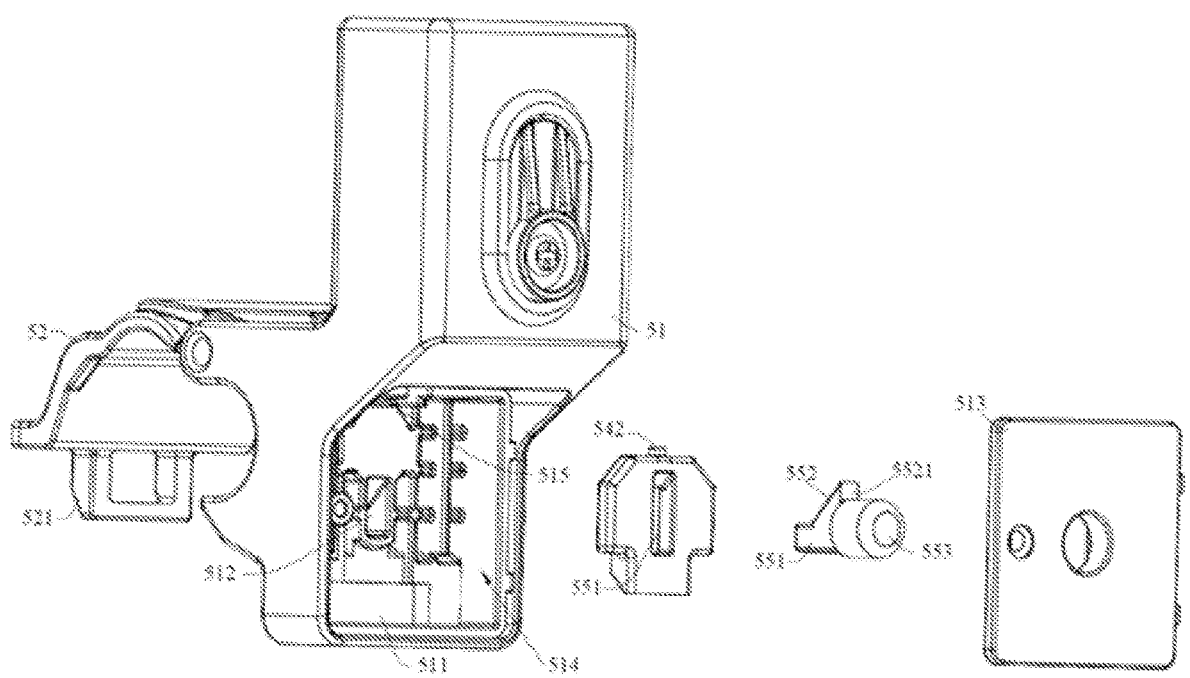
FIG. 13 is a schematic structural view of internal components of the expanding seat in FIG. 9.
Figure 14:
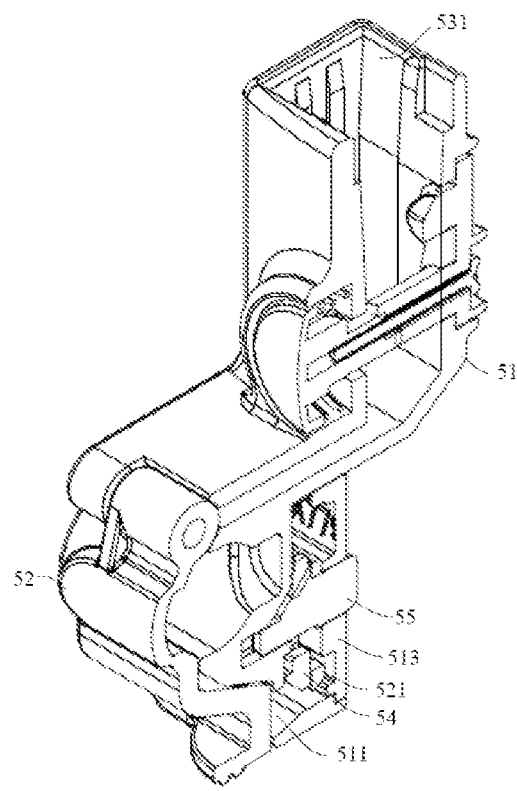
FIG. 14 is a schematic view of a cooperation relationship of internal components of the expanding seat in FIG. 9.
Figure 15:
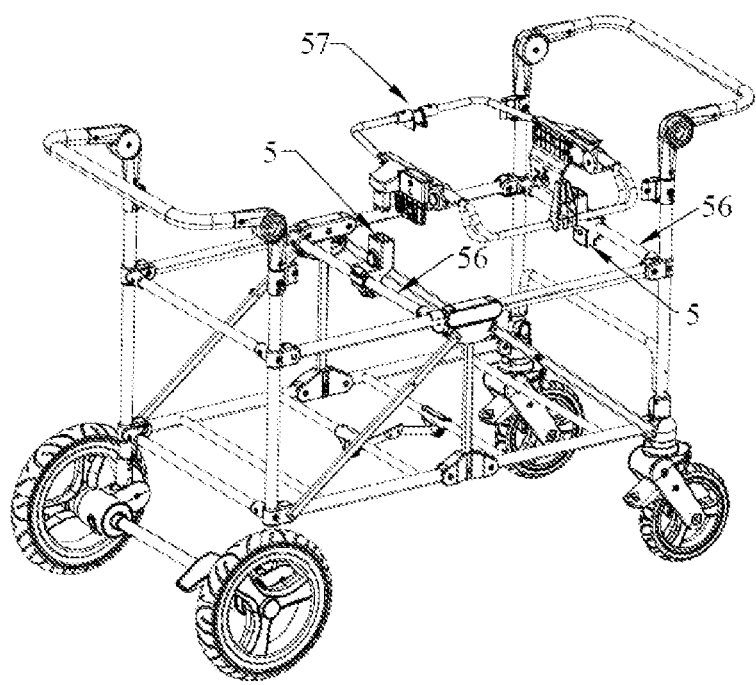
FIG. 15 is a schematic view illustrating the extended system in FIG. 9 in application.
Figure 16:
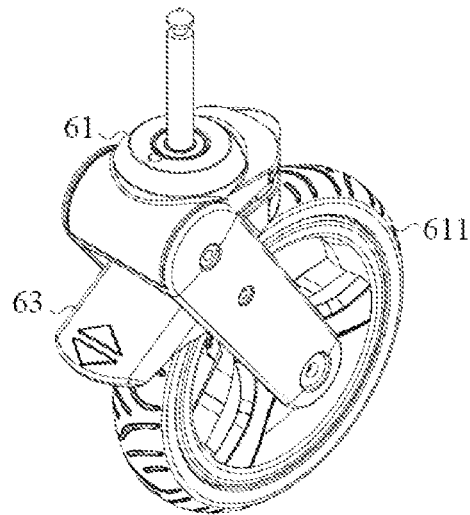
FIG. 16 is a schematic view of a braking system of a cart according to one embodiment.
Figure 17:
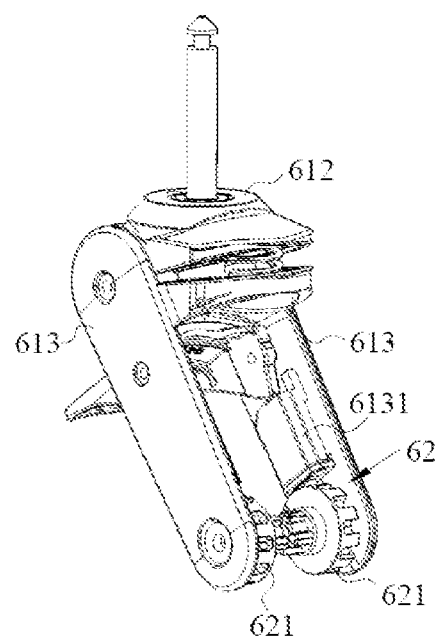
FIG. 17 is a schematic view of an internal structure (rollers are omitted) of the braking system in FIG. 16.
Figure 18:
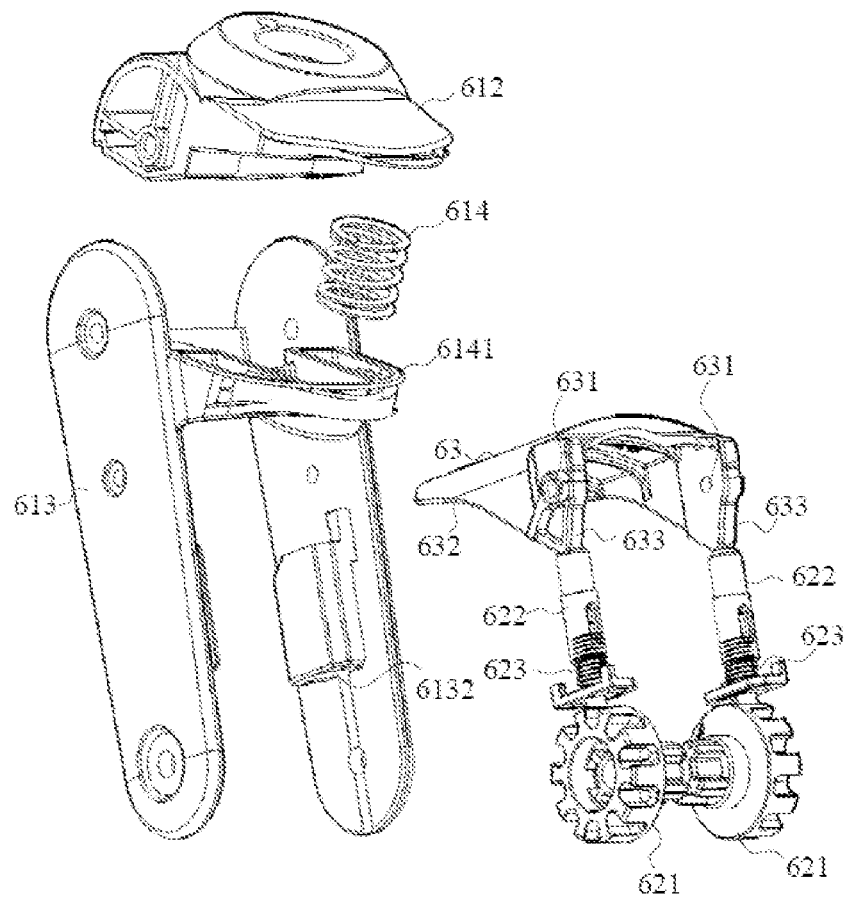
FIG. 18 is an exploded view of the braking system in FIG. 16.
Figure 19:
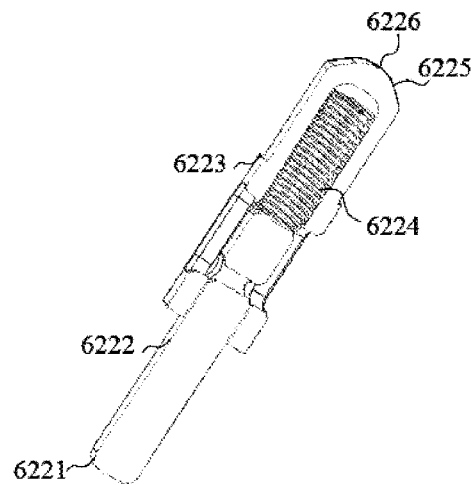
FIG. 19 is a schematic view of an internal structure of a braking pin in FIG. 16.
Figure 20:
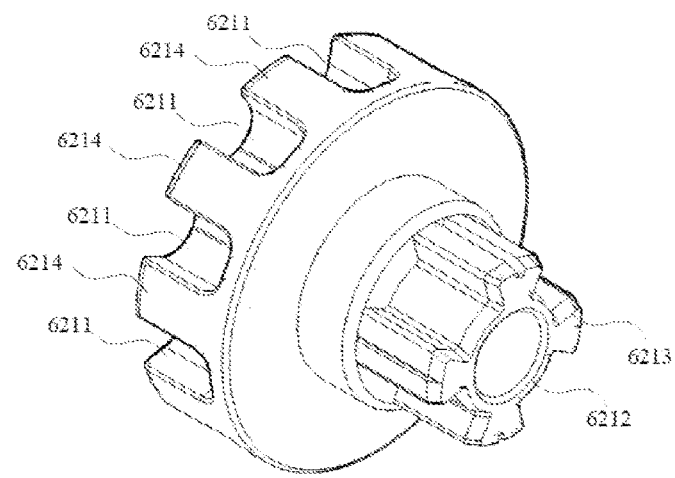
FIG. 20 is a schematic view of a brake disc in FIG. 16.
Figure 21:
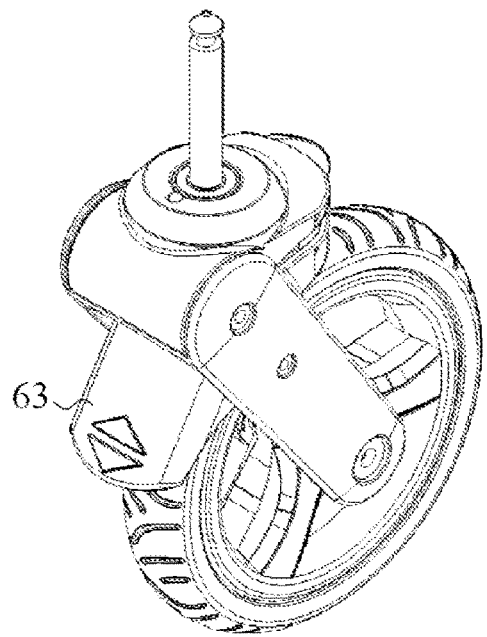
FIG. 21 is a schematic view illustrating the braking system in FIG. 16 is activated.
Figure 22:
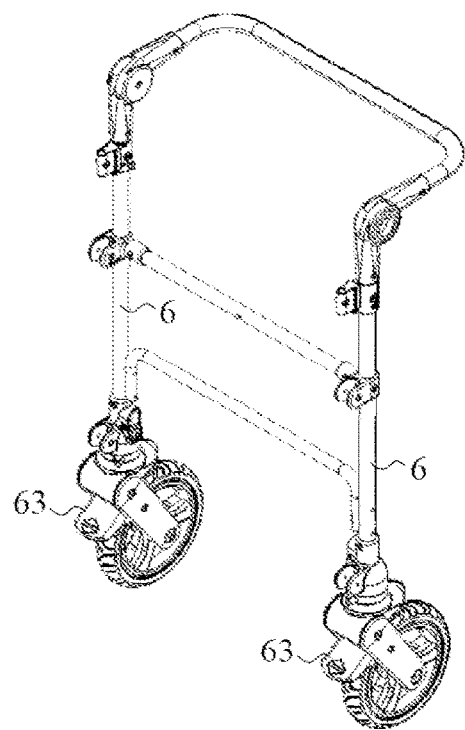
FIG. 22 is a schematic view showing the braking system in FIG. 16 in application.
Figure 23:
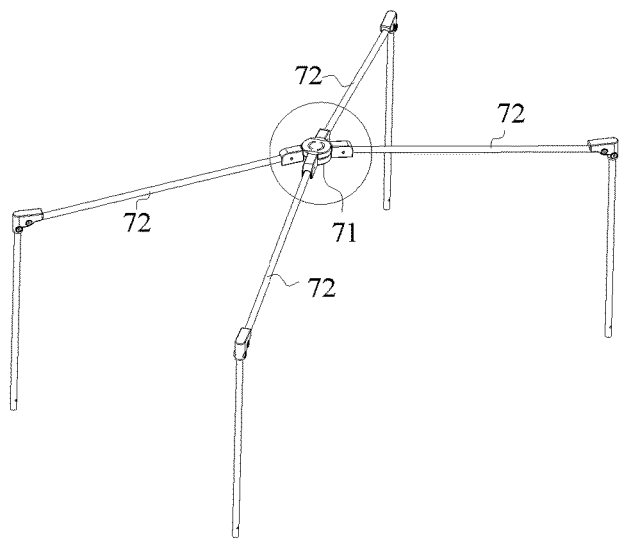
FIG. 23 is a schematic view of a roof bracket according to one embodiment.
Figure 24:
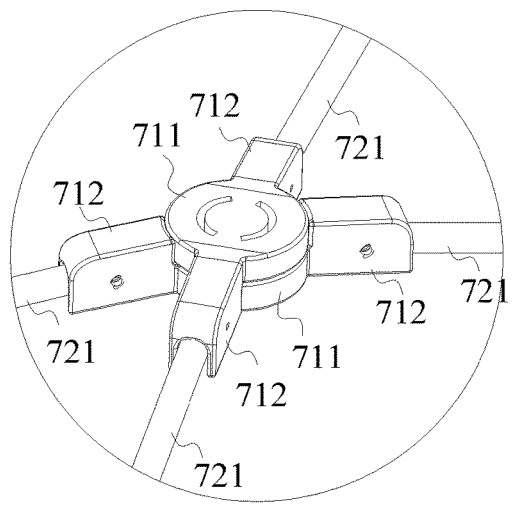
FIG. 24 is an enlarged view of a rotating center in FIG. 1.
Figure 25:
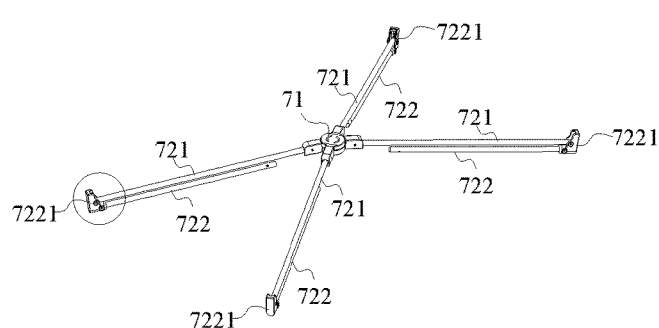
FIG. 25 is a schematic phase view showing the roof bracket in FIG. 1 in a first stage of a folding process.
Figure 26:
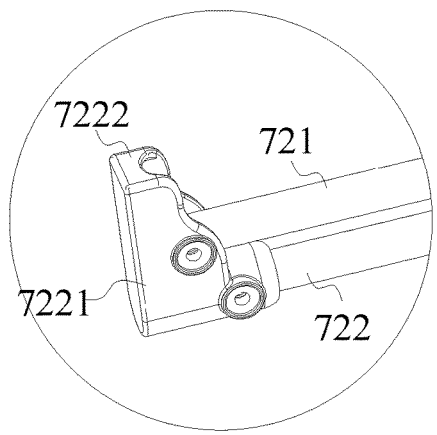
FIG. 26 is an enlarged view of a limiting seat in FIG. 25.

Referring to FIGS. 9 and 10, the present disclosure discloses an extended system for a cart, including a cart frame having a folded state and a deployed state consisting of two side frames. The extended system includes an extended seat 5 used for mounting an extended device 57 and one or more support rods 56. Each support rod 56 is detachably mounted on the cart frame or is configured as one part of the cart frame. The extended seat 5 includes:
- a first fastener 51 leaning against a circumferential surface of the support rod 56;
- a second fastener 52 cooperates with the first fastener 51 to enclose the support rod 56, one end of the second fastener 52 being hinged to the first fastener 51, and the other end being provided with a locking part 521 engaged with the first fastener 51;
- an adapter seat 53 fixed to the first fastener 51 or the second fastener 52, the adapter seat 53 being provided with a plugging opening 531 for the extended device 57; and
- a spring bolt 54 slidably mounted on the first fastener 51 and configured to keep the locking part 521 in a state of being engaged to the first fastener 51.

In the extended system, the extended device 57 is connected to the cart frame through the extended seat 5, and the extended seat 5 is also detachably connected to the cart frame. In one occasion that no extended system is needed, the extended system will completely not affect the use of the cart. When the extended device 57 is needed, the extended system can be mounted conveniently and quickly. The adaptability of the cart is greatly improved, and use demands for different occasions can be met.

In the specific design, the first fastener 51 and the second fastener 52 are engaged to each other to enclose the support rod 56, thus realizing connection between the extended seat 5 to the support rod 56. On the premise that the size of the support rod 56 is defined, the smaller a space enclosed by the first fastener 51 and the second fastener 52 is, the tighter connection between the extended seat 5 and the support rod 56 is. When the extended device 57 is mounted on the cart, the first fastener 51 and the second fastener 52 need to ensure the mounting strength, that is at least prevent the size of the enclosed space from increasing. Therefore, it is required to ensure the cooperation effect of the first fastener 51 and the second fastener 52 at the locking part 521. There are various forms of the locking part 521 and the first fastener 51. For example, the locking part 521 is provided with a ratchet, and a surface of the first fastener 51 is provided with a surface cooperating with the ratchet. The ratchet of the locking part 521 is engaged on the first fastener 51 by means of an elastic force formed by deformation of the locking part 521 itself. For another example, the locking part 521 is provided with a deformable elastic band, and the first fastener 51 is provided with an engaging slot perpendicular to a movement direction of the second fastener 52. The elastic band is fixed in the engaging slot through an attaching component. The attaching component may be an adhesive, magnetic, hook and loop fastener, and various other forms.

However, the connection between the locking part 521 and the first fastener 51 directly affects the mounting effect of the extended seat 5, thus affecting the mounting effect of the extended device 57. Meanwhile, the cart is generally used to carry children. A child may possibly touch, pull, and extrude the components on the cart because of the curiosity. If the child touches the locking part 521 by accident, the mounting of the extended seat 5 will possibly be failure.

Therefore, in one embodiment, referring to FIG. 10, a locking slot 511 is defined on the first fastener 51; and the locking part 521 is engaged into the locking slot 511, so as to be kept engaged to the first fastener 51.

The locking slot 511 can effectively accommodate the locking part 521, so as to separate the locking part 521 from an external environment and avoid an external foreign matter or a user from accidentally touching the locking part 521, which significantly improves the reliability of locking. Meanwhile, the spring bolt 54 cooperating with the locking part 521 is also likely interfered by the outside. For example, vibration of the cart in travelling may possibly cause the spring bolt 54 to move. Therefore, in one embodiment, referring to FIGS. 10-14, the extended seat 5 further includes:

an elastic member (not shown) arranged between the first fastener 51 and the spring bolt 54 and used to maintain the spring bolt 54 at a locked position;

a drive member 55 slidably mounted on the first fastener 51 and configured to drive the spring bolt 54 to move and overcome an elastic force of the elastic member to leave the locked position.

The elastic member can maintain the spring bolt 54 at the locking position, which prevents the spring bolt 54 from being accidentally leaving the locked position. The drive member 55 can be convenient for the user to overcome the elastic force of the elastic member and to release the spring bolt 54 from the locked position. The cooperation between the drive member 55 and the elastic member improves the stability of the spring bolt 54. Specifically, there are actually various setting methods for the drive member 55. For example, pulling a wire rod to a position convenient for user's operation may be adopted. However, the above implementation manner is relatively complicated and will increase the complexity of the drive member 55. Therefore, in one embodiment, the drive member 55 includes:

a guide part 551 slidably mounted on the first fastener 51;

a working part 552 abutting against the spring bolt 54 and driving the spring bolt 54 to move;

an operation part 553 extending to the outside of the first fastener 51.

The drive member 55 directly exerts an acting force to the spring bolt 54 by its own structure to realize the movement of the spring bolt 54, which can simplify the movable components and is convenient for the manufacturing and assembling of the spring bolt 54 and the drive member 55. A guide slot 512 corresponding to the guide part 551 is further provided in the first fastener 51. The drive member 55 passes through an avoiding slot 541 on the spring bolt 54 and engaged in the guide slot 512. The guide slot 512 may at least accommodate one part of the working part 552. Both the spring bolt 54 and the drive member 55 are guided by the first fastener 51, which can realize accurate cooperation between the drive member 55 and the spring bolt 54. In a particular design, the spring bolt 54 may be driven by the drive member 55 in multiple methods. For example, the drive member 55 is slidably mounted on the first fastener 51 and abuts against the spring bolt 54. The movement of the drive member 55 directly drives the spring bolt 54 to move towards the same direction, so as to release the locking part 521. For another example, the drive member 55 may be provided with a gear, and the spring bolt 54 is provided with a rack, thus realizing that the movement direction of the drive member 55 is inconsistent with the moving direction of the spring bolt 54, which is convenient for spatial arrangement. In one embodiment, there is an included angle between the moving direction of the spring bolt 54 and the moving direction of the drive member 55.

As shown in the figures, after the extended seat 5 is mounted, the locking part 521 is located below the support rod 56. As the first fastener 51 has a small portion located below the support rod 56, where is unsuitable for providing more components. More importantly, to release the extended seat 5, the second fastener 52 moves away from the support rod 56. It is more suitable to provide the drive member 55 on a side of the first fastener 51 facing away from the second fastener 52, and the learning cost of the user is reduced. In an operation process, an inclined surface on the working part 552 cooperates with an inclined at the top of the avoiding slot 541. The movement of the drive member 55 perpendicular to the guide slot 512 is converted into the movement of the spring bolt 54 in an up-down direction in the figure, thus realizing locking and unlocking of the locking part 521. When the user operates the drive member, this operation is usually invisible, the spring bolt 54 and other components may be easily touched. Therefore, in one embodiment, a cover plate 513 is further provided on the side of the first fastener 51 facing away from the second fastener 52. An opening 5131 for avoiding the operation part 553 is formed in the cover plate 513. The spring bolt 54 is located at the locked position, and at least one part of the working part 552 abuts against an inner side wall of the cover plate 513.

The cover plate 513 can shield the movable components to reduce the possibility of occurrence of a pinching slit. The cover plate 513 may also limit the drive member 55. The movement of the drive part towards the second fastener 52 is limited by the first fastener 51, and the movement of the drive member 55 facing away from the second fastener 52 is realized by a limiting end 5521 of the working part 552 abutting against the cover plate 513.

In order to ensure the integrity of an outer tube of the extended seat 5, in one embodiment, the side of the first fastener 51 facing away from the second fastener 52 is further provided with a working cavity 514, and the spring bolt 54 is slidably mounted in the working cavity 514. The locking part 521 extends into the working cavity 514 to be engaged with the spring bolt 54.

The working cavity 514 is actually closed by the cover plate 513, thus realizing that the movable components are all accommodated in the closed space, which reduces the possibility of pinching hands and also improving the stability of the movements of the spring bolt 54, the drive member 55, and the components. Therefore, the extended seat 5 can realize stable mounting and disassembling. In the mounting and disassembling process, the elastic member will be compressed and restored. In complicated occasions of daily use, the elastic member may possibly fail in positioning. The elastic member needs to be stably mounted. In one embodiment, the spring member is a pressure spring. A positioning post 542 extending into the pressure spring is arranged on the spring bolt 54. A positioning cavity 515 for accommodating at least one part of the pressure spring is defined in the first fastener 51.

Under the cooperation between the first fastener 51 and the second fastener 52, the extended seat 5 can be stably mounted on the support rod 56. However, if the extended seat 5 is subjected to a circumferential force of the support rod 56, the extended seat 5 will have a rotation trend around the support rod 56 serving as an axis. The rotation trend may be restrained by means of a friction force among the first fastener 51, the second fastener 52, and the support rod 56. However, an extremely high requirement is put forward to the accuracy of the first fastener 51, the second fastener 52, and the support rod 56. Therefore, in one embodiment, a positioning hole 561 is formed in a circumferential surface on the support rod 56. A side wall of the second fastener 52 facing the support rod 56 is provided with a positioning pin (not shown) cooperating with the positioning hole 561.

During the mounting of the extended seat 5, the user only needs to align the positioning pin to the positioning hole 561, the extended seat 5 can be stably assembled to the support rod 56. Meanwhile, when there are a plurality of extended seats 5 on the cart, the adapter seats 53 of all the extended seats 5 can be ensured to face towards the same direction by means of the positioning pin and the positioning hole 561, which is convenient for mounting of the extended device 57.

In the mounting process of the extended device 57, pressures and pull forces will be applied to the extended seats 5. In one embodiment, an axial direction of the positioning hole 561 is perpendicular to an inserting direction of the plugging opening 531.

As shown in the figures, the adapter seat 53 may be located on one side of the support rod 56. In the mounting process of the extended device 57, the extended seat 5 may have a rotation movement trend along the support rod 56. This movement trend is restrained by the engagement of the positioning hole 561 and the positioning pin. Therefore, if the axial direction of the positioning hole 561 is perpendicular to the plugging direction of the plugging opening 531, the positioning hole 561 can provide a maximum stable torque to ensure the mounting strength of the extended seat 5.

Referring to FIGS. 9-15, mounting and disassembling processes of the extended device 57 are described below in combination with specific components:

When the user needs to mount the extended device 57, the extended seat 5 needs to be mounted at first. The extended seat 5, such as the extended seat 5 on the right in the drawing, may be mounted on the rod pieces of the cart frame. At this time, the corresponding rod pieces of the cart frame achieves the same effect as that of the support rod 56. The user may mount a support rod 56 additionally. Two ends of the support rod 56 are provided with clips 562 clamped to the rod pieces of the cart frame. When the extended device is mounted in place, the support rod 56 may be used to support the extended seat 5. The user firstly presses the drive member 55 towards the second fastener 52. The drive member 55 moves towards the second fastener 52 under the guidance of the first fastener 51. The operation part 553 of the drive member 55 abuts against the spring bolt 54. The spring bolt 54 overcomes the elastic force of the spring member under the driving of the operation part 553, so as to move towards the upward side in the drawing to enter an unlocked position. The locking part 521 can freely leave the locking slot 511, and the second fastener 52 is freely rotated to be opened by the hinged end. After the user aligns the positioning pin on the second fastener 52 to the positioning hole 561 in the support rod 56, the first fastener 51 and the second fastener 52 are fastened. When the locking part 521 of the second fastener 52 enters the locking slot 511, the locking part 521 extrudes the spring bolt 54 to move towards the upward side in the drawing, and the spring bolt 54 overcomes the elastic force of the elastic member to move upwardly, so as to avoid the locking part 521. When the locking part 521 reaches a preset position, the spring bolt 54 enters the locking position under the driving of the elastic member. The extended seat 5 is stably mounted on the support rod 56. After all the extended seats 5 are mounted in place, the extended device 57 may be mounted on the cart frame through the adapter seats 53.

The extended device 57 is assembled by reverse operations, and descriptions thereof are omitted here.

Referring to FIGS. 16-22, the present disclosure discloses a braking system of the cart, including a foot rod 6 (any foot rod, such as the front foot rod, in the front foot assembly and the rear foot assembly mentioned above), a wheel seat 61 mounted at the bottom of the foot rod 6, and a roller 611 mounted on the wheel seat 61. A braking mechanism 62 is arranged between the wheel seat 61 and the roller 611. A fender 63 is rotatably mounted on the wheel seat 61; the fender 63 is linked with at least one component in the braking mechanism 62; and the fender 63 has a first position for activating the braking mechanism 62 and a second position for releasing the braking mechanism 62.

In the technical solution disclosed by the present disclosure, the movable fender 63 drives the braking mechanism 62, which improves the repeated use of the component, simplifies the structure, and facilitates the production and use.

In a specific implementation mode, there are various forms and mounting methods for the fender 63. The fender 63 is not only limited to a plate, it may be a rod piece, a block, and various other structures, and even may be a flexible sheet, or the like. The fender 63 serves to drive the braking mechanism 62, so the fender only needs to apply an acting force to the braking mechanism 62. The fender 63 itself may be replaced with other components of the cart frame. For example, one part of one rod piece extends to a position near to the roller 611.

In fact, the specific form of the fender 63 depends on the structure of the braking mechanism 62. The reason is that when the braking mechanism 62 is different, different types of acting forces are required. In one embodiment, the braking mechanism 62 includes:

a braking disk 621 which is kept in synchronous rotation with the roller 611 and is provided with several braking slots 6211 along a circumferential direction;

a braking pin 622 slidably mounted on the wheel seat 61 and linked with the fender 63, the fender 63 being located at the first position, and the braking pin 622 being engaged into the braking slot 6211.

The braking disk 621 and the roller 611 roll synchronously, and thus, the braking pin 622 prevents the braking disk 621 from rolling relative to the cart frame, which prevents the roller 611 from rolling relative to the cart frame. In a specific implementation mode, the braking disk 621 includes a connection part 6212 connected with the roller 611 at a rolling axis of the roller 611. The connection part 6212 at least partially extends into the roller 611 and is provided with an axially protruding or recessed positioning strip 6213, thus ensuring that the braking disk 621 and the roller 611 are kept in synchronous rotation. According to the specific setting of the braking mechanism 62, the braking disk 621 may be disposed on both sides of the roller 611. The braking slots 6211 are formed in the braking disk 621. When the braking pin 622 is engaged into the braking slot 6211, the rolling movement trend of the braking disk 621 will be transmitted to the wheel seat 61 through the braking pin 622. By means of the restraining of the wheel seat 61, a braking effect is achieved. The number of the braking slots 6211 shall be as large as possible to avoid such a case that the braking pin 622 fails to be aligned to the braking slot 6211. However, the increase of the number of the braking slots 6211 will thin an isolation wall 6214 between adjacent braking slots 6211, which reduces the strength of the braking mechanism 62. Therefore, an end of the braking pin 622 facing the braking disk 621 is preferably a chamfer 6221 with an arc-shaped surface. If the braking pin 622 is not aligned to the braking slot 6211, the braking pin 622 is guided to enter the braking slot 6211 to achieve the braking effect.

The braking pin 622 includes a pin body 6222, a compression sleeve 6223 mounted around the pin body 6222, and a braking spring 6224 pressed between the pin body 6222 and the compression sleeve 6223. The compression sleeve 6223 and the fender 63 interact with each other. The pin body 6222 may freely slide in the compression sleeve 6223. The force applied to the compression sleeve 6223 by the fender 63 is transmitted to the pin body 6222 through the braking spring 6224. The advantage of this design is that when the braking pin 622 is not aligned to the braking slot 6211, the fender 63 may still enter the first position, and the braking spring 6224 stores one part of energy. When the roller 611 continues to roll, the braking slot 6211 on the braking disk 621 is aligned to the braking pin 622, and the braking spring 6224 will drive the pin body 6222 to enter the braking slot 6211, thus achieving braking.

The acting force for braking is finally transmitted to the wheel seat 61. The structure of the wheel seat 61 determines the braking effect. In one embodiment, the wheel seat 61 includes:
  a rotatable seat 612 mounted at an end part of the foot rod 6;
  an oscillating arm 613 rotatably mounted on the rotatable seat 612, the roller 611 and the fender 63 being both mounted on the oscillating arm 613;
  a damping spring 614 supported between the oscillating arm 613 and the rotatable seat 612.

The rotatable seat 612 is designed to achieve an effect of a universal wheel, which is convenient for direction adjustment of the cart. This solution is generally used in the case that the braking mechanism 62 is located at the wheel seat 61 in a front wheel. In some embodiments, the braking mechanism 62 is located at a rear wheel. The wheel seat 61 of the rear wheel may be in a form without the rotatable seat 612, so as to reduce the cost. The oscillating arm 613 and the damping spring 614 are designed to effectively reduce the impact on the cart on a bumpy road and improve the pushing stability of the cart. A spring seat 6141 configured to support the damping spring 614 is further arranged on the oscillating arm 613, thus enhancing the mounting effect of the damping spring 614. In the present embodiment, a relative position between the roller 611 and the wheel seat 61 may change. Therefore, the braking mechanism 62 may need some adjustment according to this situation. In one embodiment, the braking mechanism 62 includes:
  a braking disk 621 which is kept in synchronous rotation with the roller 611 and is provided with several braking slots 6211 along a circumferential direction;
  a braking pin 622 slidably mounted on the oscillating arm 613 and linked with the fender 63, the fender 63 being located at the first position, and the braking pin 622 being engaged into the braking slot 6211.

The roller 611 is hinged to the oscillating arm 613, and their relative positions are determined, the braking pin 622 is slidably mounted on the oscillating arm 613, which can always keep a stable braking effect. The fender 63 can stably drive the braking pin 622 to enter the braking slot 6211. When the braking pin 622 is not in the braking slot 6211, the cart is in a normal movable state. The stability of the position of the braking pin 622 needs to be ensured. If the braking pin 622 accidentally enters the braking slot 6211, a risk that the cart overturns accidentally may be caused. Therefore, the braking pin 622 requires a device for maintaining its position. In a specific design, the braking pin 622 may be selectively hinged to the fender 63. The fender 63 maintains its own position by means of a friction force, so as to guarantee the position of the braking pin 622. However, this solution has a relatively high accuracy requirement for the fender 63 and the oscillating arm 613. Meanwhile, a positioning failure may occur due to wear of long-term use. Therefore, in one embodiment, the braking mechanism 62 further includes a reset member 623. Two ends of the reset member 623 respectively abut against the oscillating arm 613 and the braking pin 622 to drive the braking pin 622 to leave the braking slot 6211.

It is ensured, by means of the reset member 623, that the braking pin 622 may not accidentally fall into the braking slot 6211, which ensures the safety in use. Meanwhile, the position of the reset member 623 also needs to be stably fixed to prevent interference with the movement of the roller 611. In one embodiment, a fixed seat 6131 is arranged on the oscillating arm 613, and two ends of the reset member 623 respectively press the braking pin 622 and the fixed seat 6131.

The fixed seat 6131 may be designed in various forms. For example, it is a separate plate, which is provided with an avoiding hole 6132 which is convenient for the engagement of the braking pin 622 and the braking disk 621. In the solution shown in the figures, the fixed seat 6131 is an enclosed shell provided with the avoiding holes 6132 in the upper and lower ends. The avoiding hole 6132 in the upper end is used to avoid the head of the braking pin 622 to act with the fender 63, and the avoiding hole 6132 is used to avoid the bottom of the braking pin 622 to cooperate with the braking disk 621. Using a shell as the fixed seat 6131 has the advantages that the braking pin 622 is accommodated in a relatively closed space, thus avoiding muddy water and other foreign matters carried by the roller 611 from affecting the action of the braking pin 622. There are multiple options for an actual mounting position of the fender 63. For example, the fender 63 is mounted on the extending part of the oscillating arm 613. In one embodiment, the fender 63 is mounted between the rotatable seat 612 and the roller 611. This design has the advantages that the fender 63 and the roller 611 move towards each other, which facilitates the transmission of the braking mechanism 62 and also facilitates a mud blocking effect. In the present embodiment, the fender 63 is a plate extending along a tangent direction of the roller 611. In other embodiments, the fender 63 may be in an arc shape or even a profiled shape. The mounting and shape of the fender 63 determine the mud blocking effect and the effect of transmission of the braking mechanism 62. In one embodiment, the fender 63 includes:
- a rotatable portion 631 mounted on the oscillating arm 613 through a first pivot;
- a mud blocking part 632 connected with the rotatable portion 631 and extending therefrom;
- an eccentric part 633 abutting against and linked with the braking pin 622.

The eccentric part 633 serves to form acting points away from a rotating axis by different distances with the rotation of the fender 63, so as to drive the braking pin 622 to move to activate the braking mechanism 62. This design has the advantages of good stability, no influence from the external environment, low accuracy requirement, fewer components, and simple and stable structure.

In order to reduce the resistance to the action of the braking mechanism 62, in one embodiment, an end surface of the braking pin 622 facing the eccentric part 633 is a semispherical guide surface 6225; the braking pin 622 is engaged into the braking slot 6211; and the eccentric part 633 abuts against a vertex 6226 of the guide surface 6225. The guide surface 6225 can transform the rotation of the fender 63 into a linear movement of the braking pin 622, thus reducing the wear between the components. After the braking pin 622 moves in place, the vertex 6226 of the guide surface 6225 abuts against the eccentric part 633. At this time, the structure of the braking pin 622 and the fender 63 enters a dead position, so the fender 63 cannot be driven by the braking pin 622, thus ensuring the stability of the braking action and that the braking mechanism 62 will not be accidentally released.

In one embodiment, the rotating axis of the roller 611, an oscillating axis of the oscillating arm 613, and the oscillating axis of the fender 63 are parallel, and the moving direction of the braking pin 622 is perpendicular to the rotating axis of the roller 611.

In practice, the rotating axis of the roller 611, the oscillating axis of the oscillating arm 613, and the oscillating axis of the fender 63 are all located on the oscillating arm 613. There are two oscillating arms 613 shown in the figures, which are disposed in parallel. Therefore, it can be ensured that the rotating axis of the roller 611, the oscillating axis of the oscillating arm 613, and the oscillating axis of the fender 63 are parallel, thus providing a stable movement of the roller 611. The moving direction, i.e., the axial direction, of the braking pin 622, is perpendicular to the rotating axis of the roller 611, so the maximum braking torque can be realized and the braking effect is ensured.

A braking process will be described below in combination with specific components.

When a user needs to brake the cart, the user applies an acting force to the mud blocking part 632 in an upward direction referring to the drawing to rotate the fender 63, the fender 63 rotates around the rotating axis, and a distance from the farthest end of the eccentric part 633 to the rotating axis increases, thus driving the braking pin 622 to move down and extend out of the avoiding hole 6132 in the lower end of the fixed seat 6131 and into the braking slot 6211. At this time, the roller 611 is unable to roll.

When the user needs to push the cart, the user only needs to applies an acting force to the mud blocking part 632 in a downward direction referring to the drawing to rotate the fender 63, the fender 63 rotates around the rotating axis, a distance from the farthest end of the eccentric part 633 to the rotating axis decreases, and the fender moves away from the braking pin 622 to release the braking pin 622 to move upwardly; under the action of the reset member 623, the braking pin 622 moves upwardly and leaves the braking slot 6211; and the braking mechanism 62 releases the braking.

Referring to FIGS. 23-30, the present disclosure discloses a roof bracket to be mounted on the cart. The roof bracket includes:
- a rotating center 71 including several rotatable disks 711 which are rotatably connected;
- several groups of frames 72, the frames 72 of the same group being connected with one of the rotatable disks 711; and
- a plurality of plugs 73 respectively mounted on the frames 72 and configured to be connected with the two side frames of the cart.

The roof bracket serves to form a support system and used to mount subsequent covers and form a relatively isolated environment for a child, so as to avoid insolation and the influence of an external dirty environment. In order to provide a comfortable environment for the child, a roof usually requires a relatively large internal space. In order to facilitate folding and storage, the roof requires a folding structure. Compared to a common conch-shaped concentric hinged layer-by-layer invaginated folded form, the technical solution disclosed by the present disclosure has the advantages that it has a small volume after being folded and has a large internal space after being deployed.

In practice, there are preferably two rotatable disks 711 which are in rotatable fit with each other. This design can reduce the volume of the rotating center 71 and simplify the structure. Meanwhile, each rotatable disk 711 is connected with two frames 72. The two frames 72 are deployed and folded by means of the mutual rotation of the rotatable disks 711. Therefore, the number of the rotatable disks 711 and the number of the frames 72 can be adjusted as required. For example, the plurality of rotatable disks 711 are in rotatable fit with each other, and the plurality of frames 72 are mounted on different rotatable disks 711. This design can realize a more complicated spatial change of the roof bracket. When the rotatable disks 711 rotate relative to each other to increase a distance between the frames 72, the frames 72 define a 3D space. At this time, the roof bracket is deployed. When the rotatable disks 711 rotate relative to each other to decrease the distance between the frames 72, the 3D space inside the frames 72 decreases. At this time, the roof bracket is deployed. The roof bracket is mounted on the two side frames through the plugs 73. In practice, there are two deploying and folding methods for the roof bracket. When the deploying and folding of the two side frames are consistent with the deploying and folding movement trends of the roof bracket, the roof bracket may be deployed or folded together with the two side frames. When the deploying and folding of the two side frames are inconsistent with the deploying and folding movement trends of the roof bracket, the roof bracket may be assembled to the two deployed side frames through the plugs 73 after being deployed, and are detached and folded independently before the two side frames are folded. This is flexible and convenient.

The space after the roof bracket is deployed and the volume after the roof bracket is folded are both determined by the frames 72. In one embodiment, each group of frames includes one or more frames 72. Each frame 72 includes:
- a roof rod 721 connected with a corresponding rotatable disk 711 and extending away from the rotating center 71;

a support rod 722 rotatably connected with an end of the roof rod 721 away from the rotating center 71, the plugs 73 being mounted at a tail end of the support rod 722.

In a deployed state of the roof bracket, all the roof rods 721 are radially arranged at a periphery of the rotating center 71. In a folded state of the roof bracket, all the roof rods 721 and the support rods 722 are gathered.

In the present embodiment, each rotatable disk 711 is connected with two frames 72 which are located on the diameter of the same rotatable disk 711 and its extending line. The frame 72 has a folded state and a deployed state itself. When the frames 72 are in the deployed state, the roof rods 721 and the support rods 722 are deployed. When the frames 72 are in the folded state, the roof rods 721 and the support rods 722 are gathered to each other, thus realizing a relatively large deployed space and a relatively small folded volume. In order to ensure the stability of the deploying of the frames 72, in one embodiment, the roof rods 721 and the support rods 722 cooperate with each other through limiting seats 7221. One of the roof rod 721 and the support rod 722 serves as a fixed member fixedly connected to the limiting seat 7221, and the other one serves as a rotatable member rotatably connected to the limiting seat 7221. The limiting seat 7221 is provided with a limiting part 7222. When the roof rod 721 and the support rod 722 are deployed, the limiting part 7222 abuts against the rotating member to restrain the included angles between the roof rod 721 and the support rod 722.

After the frames 72 are deployed, the deployed angles between the roof rods 721 and the support rods 722 are restrained by the limiting seats 7221, thus ensuring the stability of deploying. The frames 72 can bear an external force to ensure the structural integrity. However, this is only the folding of the frames 72. After the rotatable disks 711 rotate each other to fold the roof bracket, the roof bracket still has a large volume. Therefore, in one embodiment, all the rotatable disks 711 are stacked up along the axial direction. Connection lugs 712 are provided at the peripheries of all the rotatable disks 711, and the roof rods 721 in the frames 72 connected with the rotatable disks 711 are hinged to the corresponding connection lugs 712.

After all the rotatable disks 711 are stacked up along the axial direction, the rotation between all the rotatable disks 711 may be restrained through the connection lugs 712, that is, the lengths of the connection lugs 712 in the axial direction of the rotatable disks 711 may be possibly greater than the lengths of the rotatable disks 711 in the axial direction. Therefore, the connection lugs 712 of different rotatable disks 711 may abut against each other.

The rotation extent between all the rotatable disks 711 may be further limited through a position relationship between the frames 72. After the roof bracket enters the folded state, all the folded frames 72 are gathered, thus realizing a relatively small folded volume which is convenient for carrying and storage.

Since the roof bracket has a plurality of foldable structures, the stability of the deployed state is very important. In one embodiment, the plugs 73 are provided with locking mechanisms and guide mechanisms which cooperate with the two side frames of the cart.

The guide mechanisms can provide limitation for the roof bracket in addition to the limitation in the gravity direction, and the locking mechanisms can provide connection strength. Therefore, the roof bracket having a plurality of joints can also ensure the deploying effect.

The present disclosure further discloses a roof including an awning (not shown) mounted on the frames 72 in the above technical solution and changing as the relative position of all the frames 72 changes.

The awning can achieve a enclosure effect to provide a good protection effect on a child or other passengers or objects.

Figure 30:
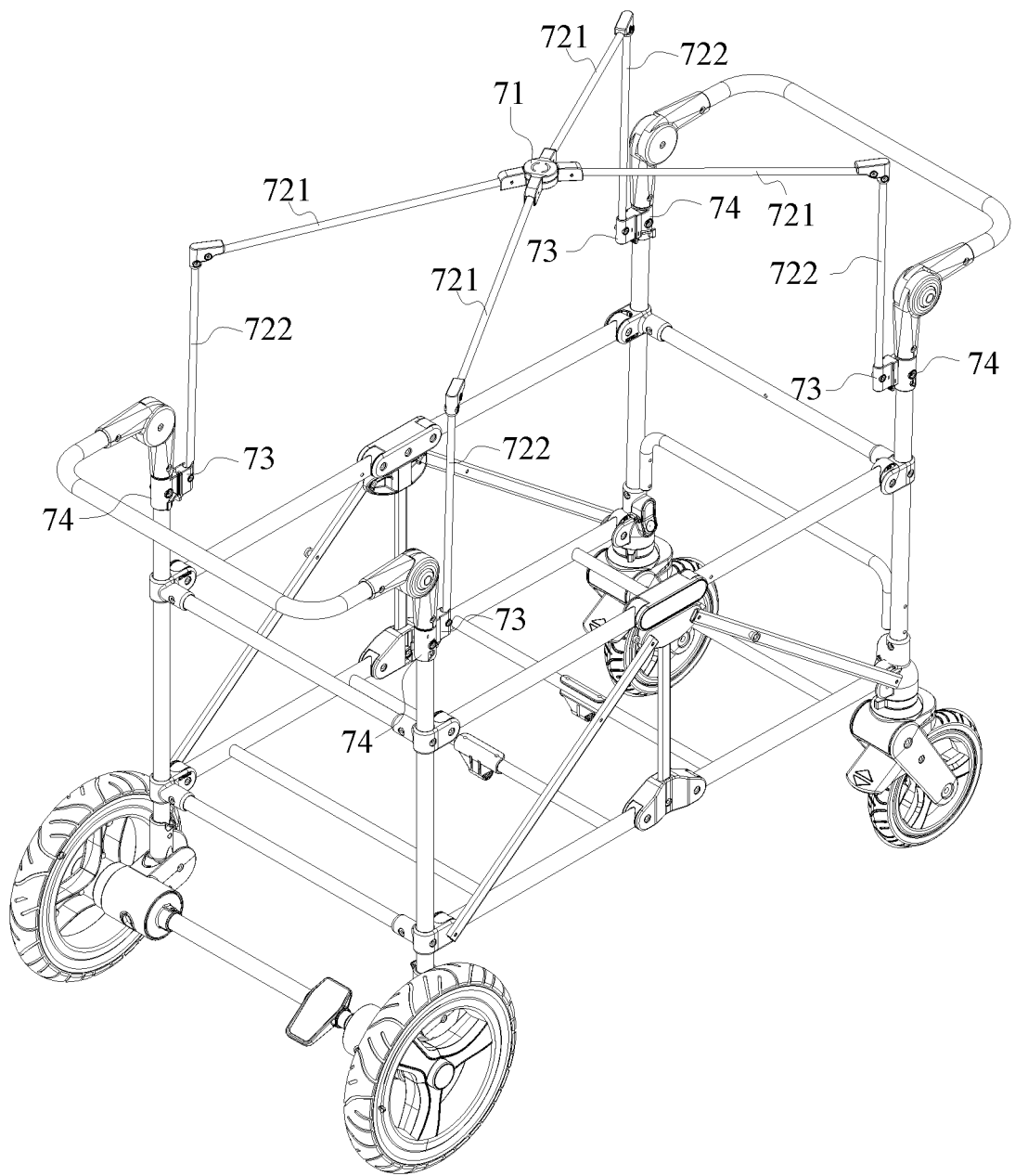
FIG. 30 is a schematic view of the roof bracket in application.

Referring to FIG. 30, the present disclosure further discloses a specific mounting method of a roof bracket. In the present embodiment, the cart includes two side frames. The roof bracket in the above-mentioned technical solution is mounted on the two side frames. A plurality of sockets 74 are fixed on the two side frames, and all the plugs 73 in the roof bracket are detachably plugged and fixed to corresponding sockets 74.

The increase in the number of the sockets 74 can improve the stability of mounting of the roof bracket. However, the minimum number of sockets 74 required by different connection methods is also different. For example, when the socket 74 only provides one support surface, at least three sockets 74 can determine a mounting plane. For another example, when the socket 74 can provide a stable mounting point, it is possible to provide only one socket 74, and the roof bracket can be stably mounted on the two side frames. In the present embodiment, the bottoms of the support rods 722 are mounted in plug holes 731 of the plugs 73. Certain rod pieces on the side frames of the cart are mounted in socket holes 741 of the sockets 74. In order to ensure the stability of the roof bracket in the moving process of the cart, in one embodiment, locking mechanism for restraining their relative positions are arranged between the plug 73 and the socket 74. The locking mechanism include:

a lock hole 732 defined in the plug 73;
a lock pin 742 arranged on the socket 74; and
a drive part 743 arranged on the socket 74 and configured to drive the lock pin 742 to enter or leave the lock hole 732.

After the lock pin 742 enters the lock hole 732, relative movements of the plug 73 and the socket 74 can be restrained, thus restraining a relative position relationship between the plug 73 and the socket 74 from locking the roof bracket and the two side frames. The mounting and disassembling of the roof bracket by a user can be realized by the drive parts 743. In one embodiment, the drive part 743 includes:

a deformation strip 7431 formed by extending from the socket 74;
an operation part 7432 mounted at one end of the deformation strip 7431.

The lock pin 742 is mounted on the deformation strip 7431. After the plug 73 and the socket 74 are connected, the deformation strip 7431 abuts against the plug 73, and the lock pin 742 is accommodated in the lock hole 732.

The drive part 743 serves to change the position of the lock pin 742, thus realizing locking and unlocking of the socket 74 and the plug 73. Compared to other manners, the advantage of disposing the lock pin 742 on the deformation strip 7431 is that the drive part 743 and the lock pin 742 are integrated, which can reduce the volume of the drive part 743 and save transmission components, so that the whole drive part 743 is more compact, and the roof bracket is conveniently mounted on various cart frame structures. Since the lock pin 742 and the lock hole 732 can only restrain the displacement of the socket 74 and the plug 73 on a plane, in one embodiment, the plug 73 is provided with a first limiting slot 733 for accommodating the socket 74. Each first limiting slot 733 has a C-shaped cross section, and two sides of an opening of the C shape are clamped to the sockets 74. One end of each first limiting slot 733 is closed as a first limiting end 7331. After the plug 73 and the socket 74 are connected, the first limiting end 7331 abuts against the socket 74. The socket 74 is provided with a second limiting slot 744, and a second limiting convex block 734 corresponding to the second limiting slot 744 is provided in the plug 73. After the plug 73 and the socket 74 are connected, the second limiting convex block 734 abuts against the second limiting slot 744.

By means of limiting structures, the relative movements of the corresponding plug 73 and socket 74 are restrained on a plane, which can greatly improve the stability of cooperation and the convenience of mounting.

The mounting and disassembling of the roof bracket will be described below in combination with specific components.

When a user needs to mount the roof bracket, the user opens the frames 72 of the roof bracket relative to the rotating center 71 at first, and the frames 72 move away from each other by taking the connection lugs 712 connected to them as rotating points till the frames are completely opened. At this time, parts of the frames 72 abut against the connection lugs 712. The user then opens the support rods 722, and the support rods 722 of all the frames 72 move away from their roof rods 721 by taking the limiting seats 7221 as rotating points. After the frames are deployed in place, a spatial structure of the roof bracket is formed. During specific use, the plugs 73 are mounted at the bottoms (not shown) of the support rods 722, and the plugs 73 are engaged into the sockets 74 mounted on the two side frames. By means of the guidance of the first limiting slots 733 and the second limiting slots 744, after the plugs 73 and the sockets 74 are plugged in place, the lock pins 742 enter the lock holes 732. The plugs 73 and the sockets 74 are locked. The roof bracket is mounted in place.

When the user needs to dismantle the roof bracket, the operation parts 7432 are pressed to drive the deformation strips 7431 to deform, so the lock pins 742 leave the lock holes 732, and the rest operations are preformed reversely. Descriptions thereof are omitted.

The technical features of the embodiments described above can be arbitrarily combined. In order to make the description concise, all possible combinations of various technical features in the above embodiments are not completely described. However, the combinations of these technical features should be considered as the scope described in this specification as long as there is no contradiction in them. When the technical features of different embodiments are reflected in the same accompanying drawing, it can be regarded as that the accompanying drawing, also discloses a combined example of all the embodiments involved.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the disclosure, and these transformations and improvements all fall within the protection scope of the present disclosure. Therefore, the protection scope of the patent of the present disclosure shall be subject to the appended claims.

What is claimed is:

1. A cart having a folded configuration and a deployed configuration, comprising:
   two side frames arranged opposite to each other; and
   a plurality of support members connected between the two side frames, wherein the side frames and the support members cooperatively form one cuboid-shaped space, so as to accommodate carried goods or child;
   wherein each side frame comprises a vertical synchronization rod with a front foot assembly and a rear foot assembly arranged on two sides of the vertical synchronization rod; the front foot assembly comprises a front foot rod with an upper front oscillating rod and a lower front oscillating rod hinged between the vertical synchronization rod and the front foot rod; a bottom of the front foot rod is hinged to a front wheel; the rear foot assembly comprises a rear foot rod with an upper rear oscillating rod and a lower rear oscillating rod hinged between the vertical synchronization rod and the rear foot rod; a bottom of the rear foot rod is hinged to a rear wheel, and wherein
   in the folded state, the front foot assembly and the rear foot assembly respectively move towards the vertical synchronization rod; and in the deployed state, the front foot assembly and the rear foot assembly are correspondingly unfolded;
   wherein in the deployed state of the cart, the front foot rod, the upper front oscillating rod, the lower front oscillating rod, and the vertical synchronization rod form a deformable first parallelogram, the rear foot rod, the upper rear oscillating rod, the lower rear oscillating rod, and the vertical synchronization rod form a deformable second parallelogram; the vertical synchronization rod is provided with a synchronization sliding block; the synchronization sliding block is hinged with a first diagonal draw bar and a second diagonal draw bar; and ends of the two diagonal draw bars away from the synchronization sliding block are respectively hinged to parts of corresponding parallelograms away from the vertical synchronization rod;
   wherein the front foot rod is provided with a first hinge seat at an upper part and a second hinge seat at a lower part; the two front oscillating rods are hinged to corresponding hinge seats; the first diagonal draw bar is hinged to the second hinge seat; the rear foot rod is provided with a third hinge seat at an upper part and a fourth hinge seat at the lower part; the two rear oscillating rod are hinged to corresponding hinge seats; and the second diagonal draw bar is hinged to the fourth hinge seat;
   wherein a first reinforcement rod is arranged between the first hinge seats of the two side frames; a second reinforcement rod is arranged between the second hinge seats of the two side frames; a third reinforcement rod is arranged between the third hinge seats of the two side frames; a fourth reinforcement rod is arranged between the fourth hinge seats of the two side frames;
   wherein each hinge seat comprises a first portion and a second portion that are perpendicularly connected with each other, the first portion is connected with a corresponding oscillating rod and the second portion is connected with a corresponding reinforcement rod;
   wherein in the deployed state of the cart, the first reinforcement rod, the third reinforcement rod, the upper front oscillating rods, and the upper rear oscillating rods are located on a same plane; and the second reinforcement rod, the fourth reinforcement rod, the lower front oscillating rods, and the lower rear oscillating rods are located on a same plane; and
   wherein movement of the oscillating rods is independent from the reinforcement rods.

2. The cart according to claim 1, wherein an upper joint is mounted at a top of the vertical synchronization rod, and a lower joint is mounted at a bottom; within a same side frame,
one end of the upper front oscillating rod is hinged to the upper joint, and an other end of the upper front oscillating rod is hinged to the first hinge seat;
one end of the lower front oscillating rod is hinged to the lower joint, and an other end of the lower front oscillating rod is hinged to the second hinge seat;
one end of the upper rear oscillating rod is hinged to the upper joint, and the other end of the upper rear oscillating rod is hinged to the third hinge seat;
one end of the lower rear oscillating rod is hinged to the lower joint, and an other end of the lower rear oscillating rod is hinged to the fourth hinge seat.

3. The cart according to claim 2, wherein the front foot rod and the rear foot rod are located away from the vertical synchronization rod, a top surface of the synchronization sliding block abuts against a bottom surface of the upper joint; during folding, the vertical synchronization rod moves upwardly relative to the front foot rod and the rear foot rod; and in the folded state, the front foot rod and the rear foot rod respectively move towards the vertical synchronization rod.

4. The cart according to claim 1, wherein in the deployed state of the cart, within a same side frame, the upper front oscillating rod and the upper rear oscillating rod are located on a horizontal level, and the lower front oscillating rod and the lower rear oscillating rod are located on a same level; and in the folding process of the cart, the front foot rod and the rear foot rod are always in an upright state.

5. The cart according to claim 1, wherein the support members comprise a first connection member connected between the front foot assemblies of the two side frames and a second connection member connected between the rear foot assemblies of the two side frames; a locking mechanism is arranged between the first connection member and the second connection member for restraining a relative position therebetween to keep the deployed state; and the locking mechanism further has an unlocked state for allowing the first connection member and the second connection member to move towards each other.

6. The cart according to claim 5, wherein the locking mechanism comprises:
a first lock rod hinged to the first connection member;
a second lock rod hinged to the second connection member;
a limiting seat, wherein the first lock rod and the second lock rod extending in opposite directions and being hinged to the limiting seat; and
wherein an included angle between the first lock rod and the second lock rod is 180 degrees, which is a dead position of the locking mechanism; after moving downwards and crossing the dead position, the limiting seat is in a locked state and restrains the relative movement between the first lock rod and the second lock rod; and after moving upwards to cross the dead position, the limiting seat is in an unlocked state.

7. The cart according to claim 6, wherein a mounting slot is defined in the limiting seat; the first lock rod and the second lock rod are hinged in the mounting slot; in a used state, a lower part of the mounting slot is opened to allow the first lock rod and the second lock rod to forwards rotate towards each other; a top of the mounting slot is closed to restrain reverse rotation of the first lock rod and the second lock rod.

8. The cart according to claim 1, wherein the cart further comprises a braking system; the braking system comprises at least a wheel seat mounted at a bottom of the front foot assembly and/or the rear foot assembly, each wheel seat is provided with a roller; a braking mechanism is arranged between the wheel seat and the roller; a fender is rotatably mounted on the wheel seat; the fender is linked with at least one component in the braking mechanism; and the fender has a first position for activating the braking mechanism and a second position for releasing the braking mechanism.

9. The cart according to claim 8, wherein the braking mechanism comprises:
a braking disk which is kept in synchronous rotation with the roller and is provided with braking slots along a circumferential direction; and
a braking pin slidably mounted on the wheel seat and linked with the fender, the fender being located at the first position, and the braking pin being engaged into a corresponding braking slot.

10. The cart according to claim 8, wherein the wheel seat comprises:
a rotatable seat mounted at an end part of a corresponding foot rod;
an oscillating arm rotatably mounted on the rotatable seat, the roller and the fender being both mounted on the oscillating arm; and
a damping spring supported between the oscillating arm and the rotatable seat.

11. The cart according to claim 10, wherein the braking mechanism comprises:
a braking disk which is kept in synchronous rotation with the roller and is provided with braking slots in a circumferential direction; and
a braking pin slidably mounted on the oscillating arm and linked with the fender, the fender being located at the first position, and the braking pin being engaged into a corresponding braking slot.

12. The cart according to claim 11, wherein the braking mechanism further comprises:
a reset member; two ends of the reset member respectively abut against the oscillating arm and the braking pin to drive the braking pin to leave the corresponding braking slot.

13. The cart according to claim 12, wherein a fixed seat is arranged on the oscillating arm, and two ends of the reset member respectively press the braking pin and the fixed seat.

14. The cart according to claim 11, wherein the fender comprises:
a rotatable portion mounted on the oscillating arm through a first pin;
a mud blocking part connected with the rotatable portion and extending therefrom; and
an eccentric part abutting against and linked with the braking pin.

15. The cart according to claim 14, wherein an end surface of the braking pin facing the eccentric part is a semispherical guide surface; the braking pin is engaged into the corresponding braking slot; and the eccentric part abuts against a vertex of the guide surface.

16. The cart according to claim 14, wherein a rotating axis of the roller, an oscillating axis of the oscillating arm, and an oscillating axis of the fender are parallel, and wherein a moving direction of the braking pin is perpendicular to the rotating axis of the roller.

17. The cart according to claim 10, wherein the fender is mounted between the rotatable seat and the roller.

18. The cart according to claim 1, wherein a first push handle is arranged between tops of the two front foot rods and is higher than the upper front oscillating rod, and a second push handle is provided between tops of the two rear foot rods and is higher than the upper rear oscillating rod.

19. The cart according to claim 18, wherein two ends of the first push handle are rotatably connected with the front foot rods, and two ends of the second push handle are rotatably connected with the rear foot rods; in the deployed state of the cart, the first and second push handles are horizontally disposed; and in the folded state of the cart, the first push handle is turned to move close to the front foot rods and the second push handle is turned to move close to the rear foot rods.

20. A cart having a folded configuration and a deployed configuration, comprising:
   two side frames arranged opposite to each other; and
   a plurality of support members connected between the two side frames, wherein the side frames and the support members cooperatively form one cuboid-shaped space, so as to accommodate carried goods or child;
   wherein each side frame comprises a vertical synchronization rod with a front foot assembly and a rear foot assembly arranged on two sides of the vertical synchronization rod; the front foot assembly comprises a front foot rod with an upper front oscillating rod and a lower front oscillating rod hinged between the vertical synchronization rod and the front foot rod; a bottom of the front foot rod is hinged to a front wheel; the rear foot assembly comprises a rear foot rod with an upper rear oscillating rod and a lower rear oscillating rod hinged between the vertical synchronization rod and the rear foot rod; a bottom of the rear foot rod is hinged to a rear wheel, and wherein
   in the folded state, the front foot assembly and the rear foot assembly respectively move towards the vertical synchronization rod; and in the deployed state, the front foot assembly and the rear foot assembly are correspondingly unfolded;
   wherein in the deployed state of the cart, the front foot rod, the upper front oscillating rod, the lower front oscillating rod, and the vertical synchronization rod form a deformable first parallelogram; the rear foot rod, the upper rear oscillating rod, the lower rear oscillating rod, and the vertical synchronization rod form a deformable second parallelogram; the vertical synchronization rod is provided with a synchronization sliding block; the synchronization sliding block is hinged with a first diagonal draw bar and a second diagonal draw bar; and ends of the two diagonal draw bars away from the synchronization sliding block are respectively hinged to parts of corresponding parallelograms away from the vertical synchronization rod;
   wherein the front foot rod is provided with a first hinge seat at an upper part and a second hinge seat at a lower part; the two front oscillating rods are hinged to corresponding hinge seats; the first diagonal draw bar is hinged to the second hinge seat; the rear foot rod is provided with a third hinge seat at an upper part and a fourth hinge seat at the lower part; the two rear oscillating rod are hinged to corresponding hinge seats; and the second diagonal draw bar is hinged to the fourth hinge seat;
   wherein a first reinforcement rod is arranged between the first hinge seats of the two side frames; a second reinforcement rod is arranged between the second hinge seats of the two side frames; a third reinforcement rod is arranged between the third hinge seats of the two side frames; a fourth reinforcement rod is arranged between the fourth hinge seats of the two side frames;
   wherein each hinge seat comprises a first portion and a second portion that are perpendicularly connected with each other, the first portion is connected with a corresponding oscillating rod and the second portion is connected with a corresponding reinforcement rod;
   wherein in the deployed state of the cart, the first reinforcement rod, the third reinforcement rod, the upper front oscillating rods, and the upper rear oscillating rods are located on a same plane; and the second reinforcement rod, the fourth reinforcement rod, the lower front oscillating rods, and the lower rear oscillating rods are located on a same plane;
   wherein movement of the oscillating rods is independent from the reinforcement rods; and
   wherein the support members comprise a first connection member connected between the front foot assemblies of the two side frames and a second connection member connected between the rear foot assemblies of the two side frames; a locking mechanism is arranged between the first connection member and the second connection member for restraining a relative position therebetween to keep the deployed state; and the locking mechanism further has an unlocked state for allowing the first connection member and the second connection member to move towards each other.

21. A cart having a folded configuration and a deployed configuration, comprising:
   two side frames arranged opposite to each other; and
   a plurality of support members connected between the two side frames, wherein the side frames and the support members cooperatively form one cuboid-shaped space, so as to accommodate carried goods or child;
   wherein each side frame comprises a vertical synchronization rod with a front foot assembly and a rear foot assembly arranged on two sides of the vertical synchronization rod; the front foot assembly comprises a front foot rod with an upper front oscillating rod and a lower front oscillating rod hinged between the vertical synchronization rod and the front foot rod; a bottom of the front foot rod is hinged to a front wheel; the rear foot assembly comprises a rear foot rod with an upper rear oscillating rod and a lower rear oscillating rod hinged between the vertical synchronization rod and the rear foot rod; a bottom of the rear foot rod is hinged to a rear wheel, and wherein
   in the folded state, the front foot assembly and the rear foot assembly respectively move towards the vertical synchronization rod; and in the deployed state, the front foot assembly and the rear foot assembly are correspondingly unfolded;
   wherein in the deployed state of the cart, the front foot rod, the upper front oscillating rod, the lower front oscillating rod, and the vertical synchronization rod form a deformable first parallelogram; the rear foot rod, the upper rear oscillating rod, the lower rear oscillating rod, and the vertical synchronization rod form a deformable second parallelogram; the vertical synchronization rod is provided with a synchronization sliding block; the synchronization sliding block is hinged with a first diagonal draw bar and a second diagonal draw bar; and ends of the two diagonal draw bars away from the synchronization sliding block are respectively hinged to parts of corresponding parallelograms away from the vertical synchronization rod;

wherein the front foot rod is provided with a first hinge seat at an upper part and a second hinge seat at a lower part; the two front oscillating rods are hinged to corresponding hinge seats; the first diagonal draw bar is hinged to the second hinge seat; the rear foot rod is provided with a third hinge seat at an upper part and a fourth hinge seat at the lower part; the two rear oscillating rod are hinged to corresponding hinge seats; and the second diagonal draw bar is hinged to the fourth hinge seat;

wherein a first reinforcement rod is arranged between the first hinge seats of the two side frames; a second reinforcement rod is arranged between the second hinge seats of the two side frames; a third reinforcement rod is arranged between the third hinge seats of the two side frames; a fourth reinforcement rod is arranged between the fourth hinge seats of the two side frames;

wherein each hinge seat comprises a first portion and a second portion that are perpendicularly connected with each other, the first portion is connected with a corresponding oscillating rod and the second portion is connected with a corresponding reinforcement rod;

wherein in the deployed state of the cart, the first reinforcement rod, the third reinforcement rod, the upper front oscillating rods, and the upper rear oscillating rods are located on a same plane; and the second reinforcement rod, the fourth reinforcement rod, the lower front oscillating rods, and the lower rear oscillating rods are located on a same plane;

wherein movement of the oscillating rods is independent from the reinforcement rods;

wherein the support members comprise a first connection member connected between the front foot assemblies of the two side frames and a second connection member connected between the rear foot assemblies of the two side frames; a locking mechanism is arranged between the first connection member and the second connection member for restraining a relative position therebetween to keep the deployed state; and the locking mechanism further has an unlocked state for allowing the first connection member and the second connection member to move towards each other;

wherein the locking mechanism comprises:

a first lock rod hinged to the first connection member;

a second lock rod hinged to the second connection member;

a limiting seat, wherein the first lock rod and the second lock rod extending in opposite directions and being hinged to the limiting seat; and wherein an included angle between the first lock rod and the second lock rod is 180 degrees, which is a dead position of the locking mechanism; after moving downwards and crossing the dead position, the limiting seat is in a locked state and restrains the relative movement between the first lock rod and the second lock rod; and after moving upwards to cross the dead position, the limiting seat is in an unlocked state.

* * * * *